Figure 1:
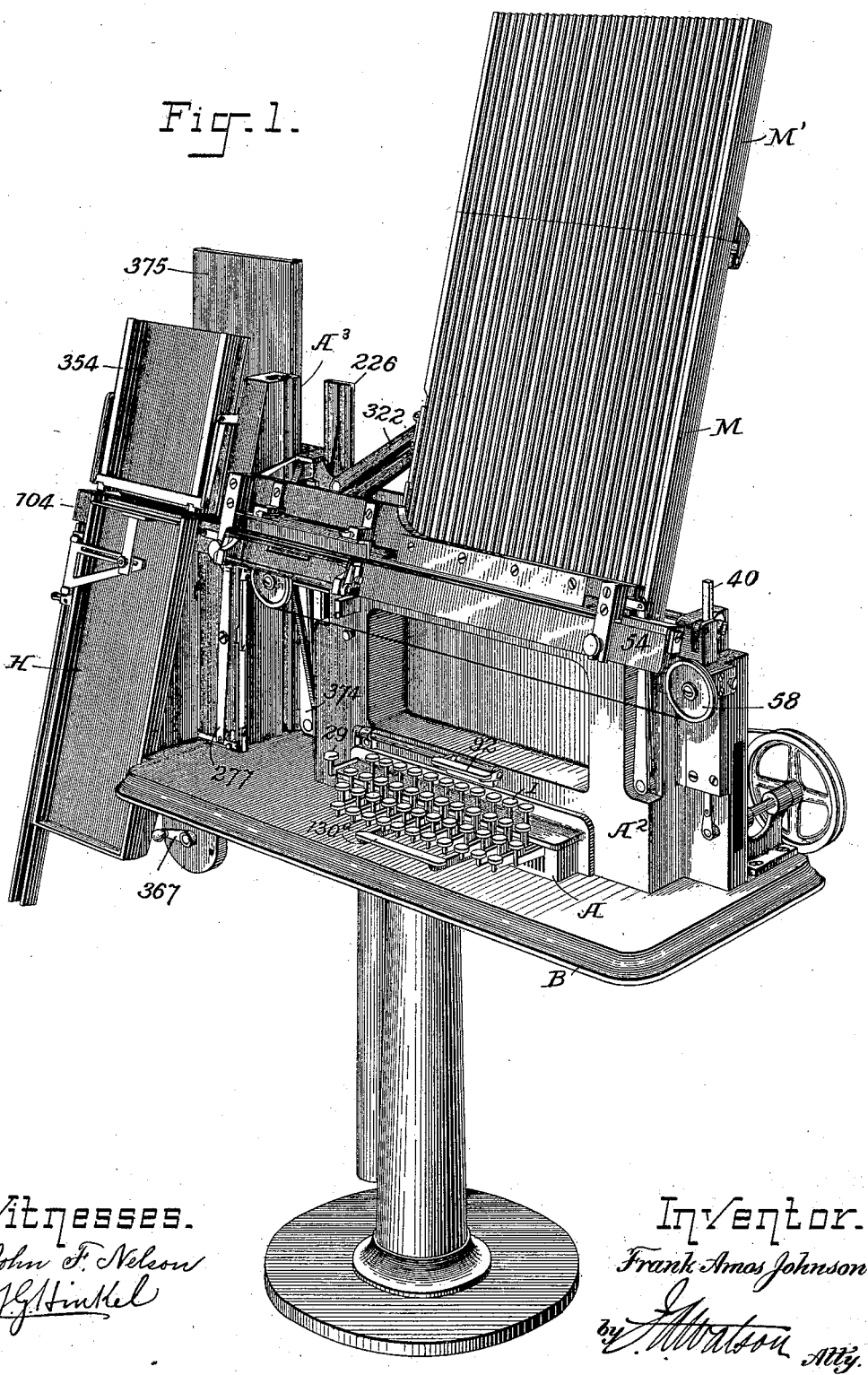

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 1.

Witnesses.
John F. Nelson
J. G. Hinkel

Inventor.
Frank Amos Johnson.
by J. A. Watson Atty.

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 3.
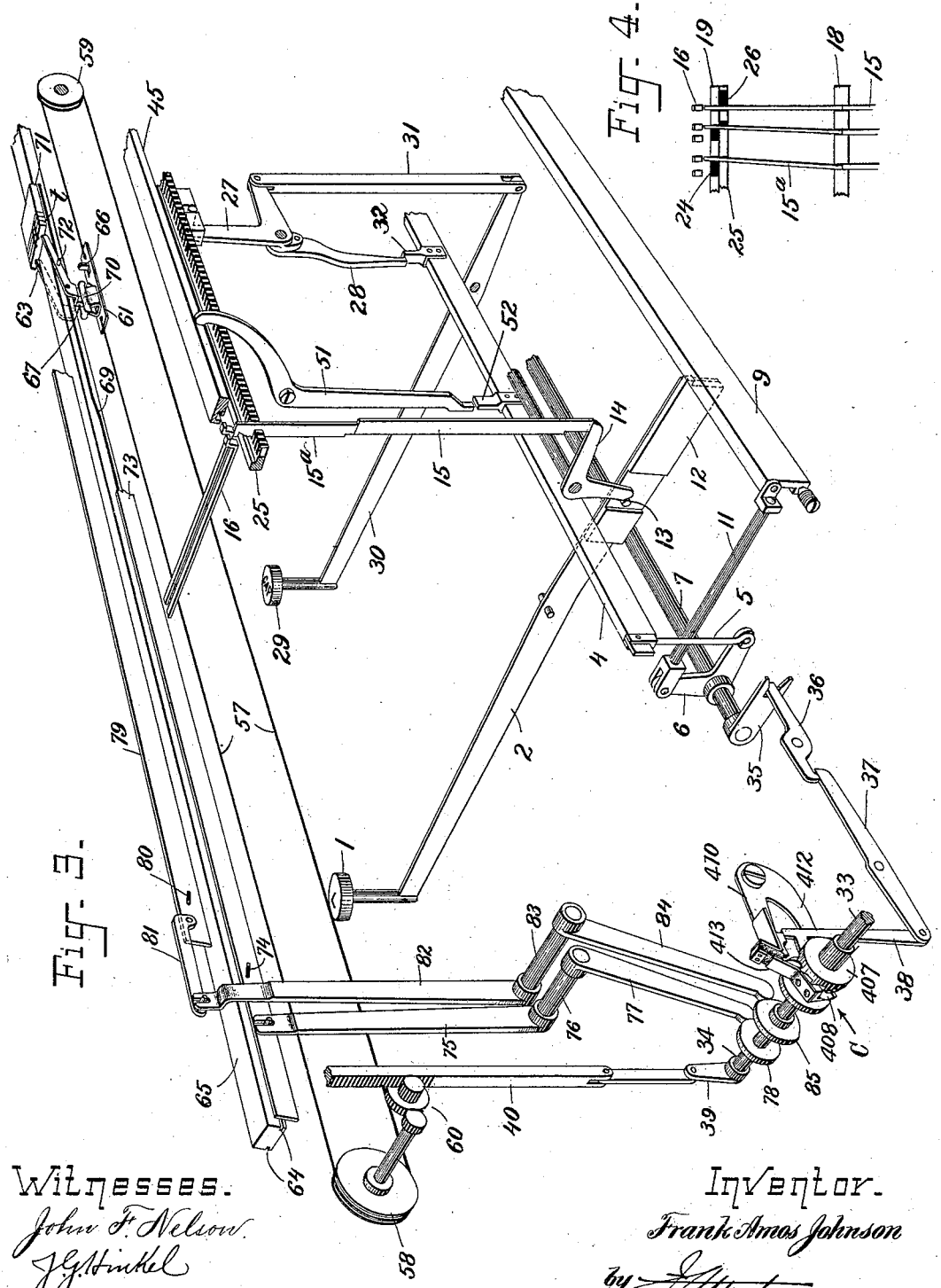
Witnesses.
John F. Nelson
J. G. Hinkel
Inventor.
Frank Amos Johnson
by J. A. Watson Att'y

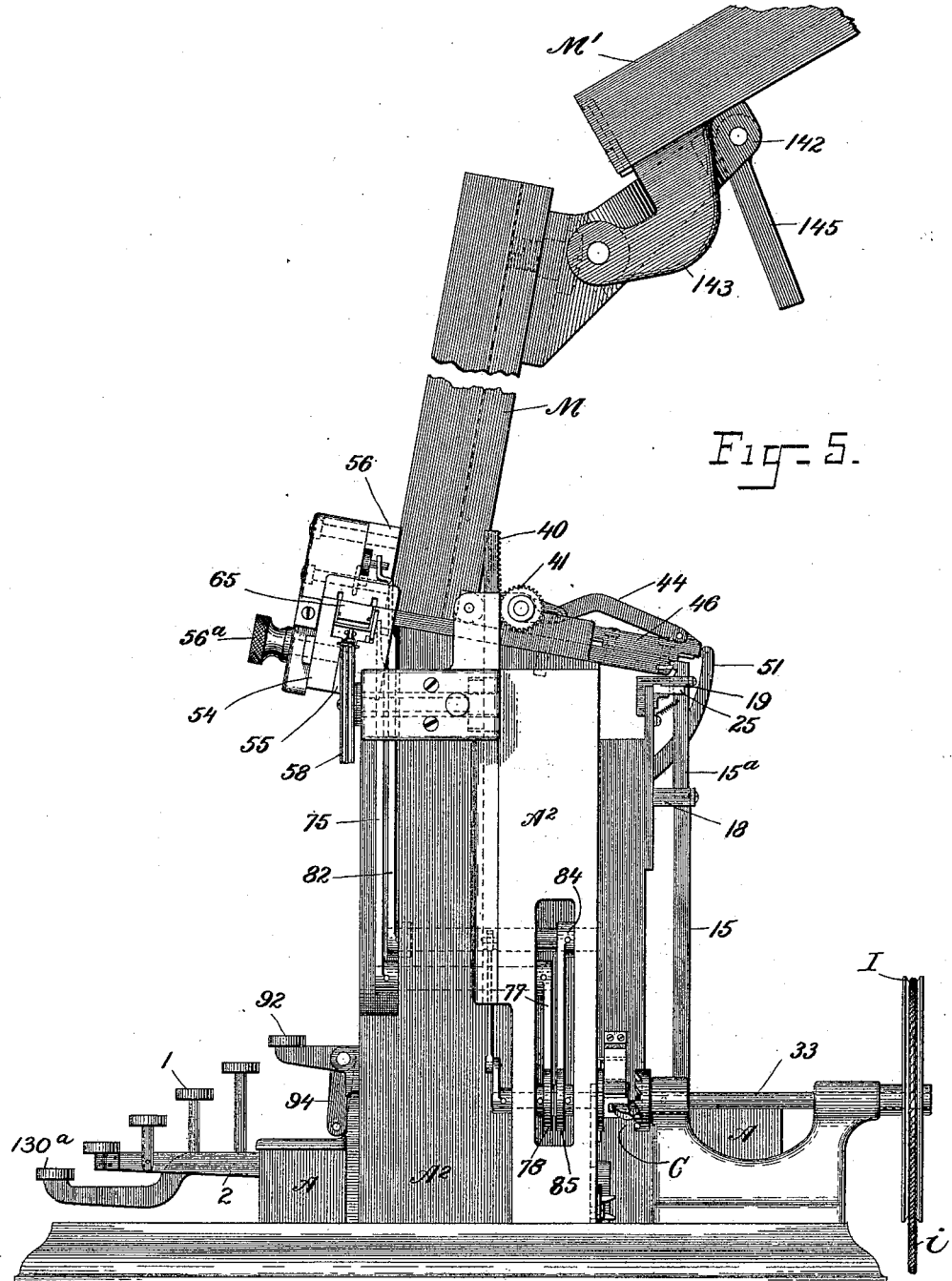

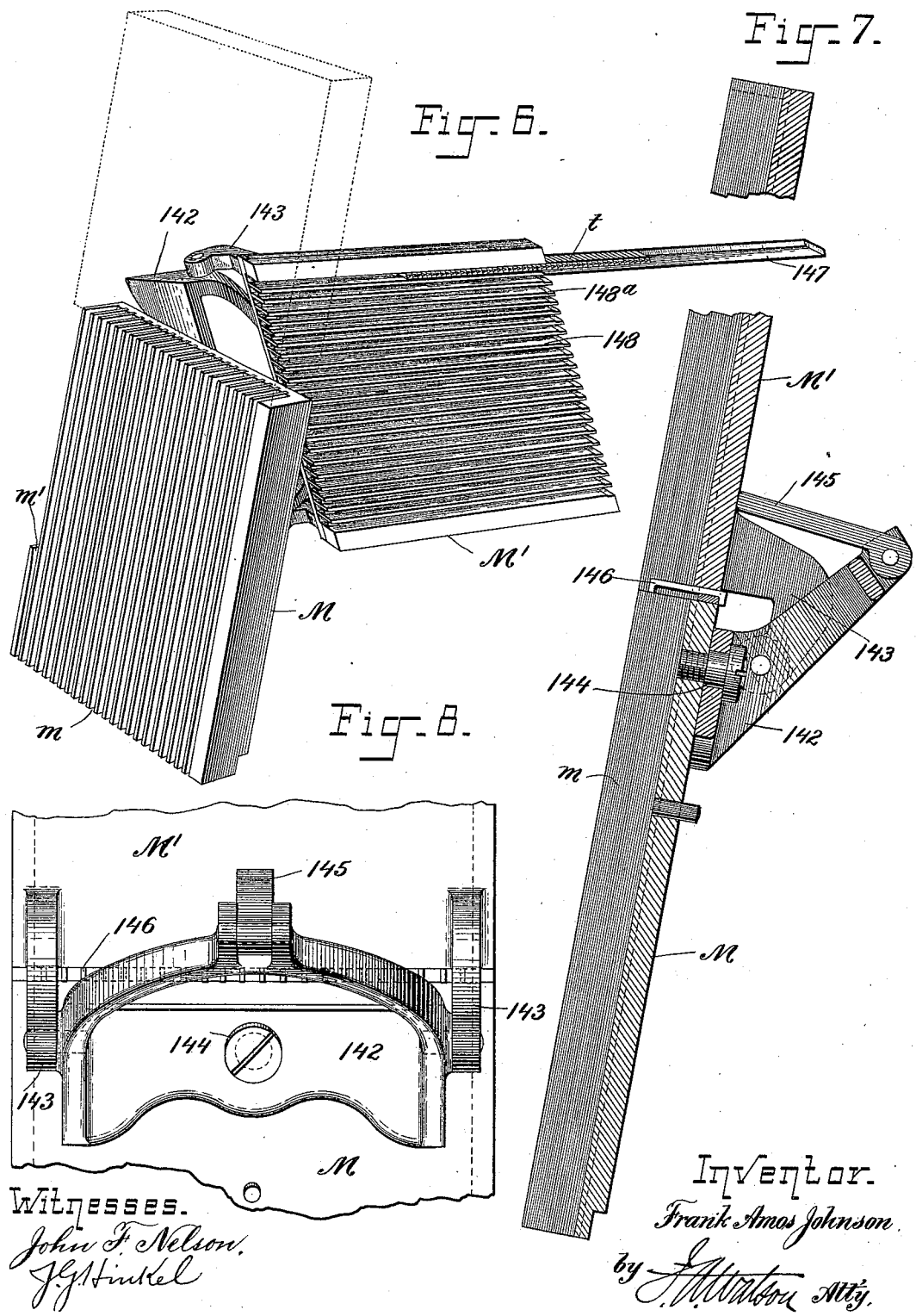

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 6.
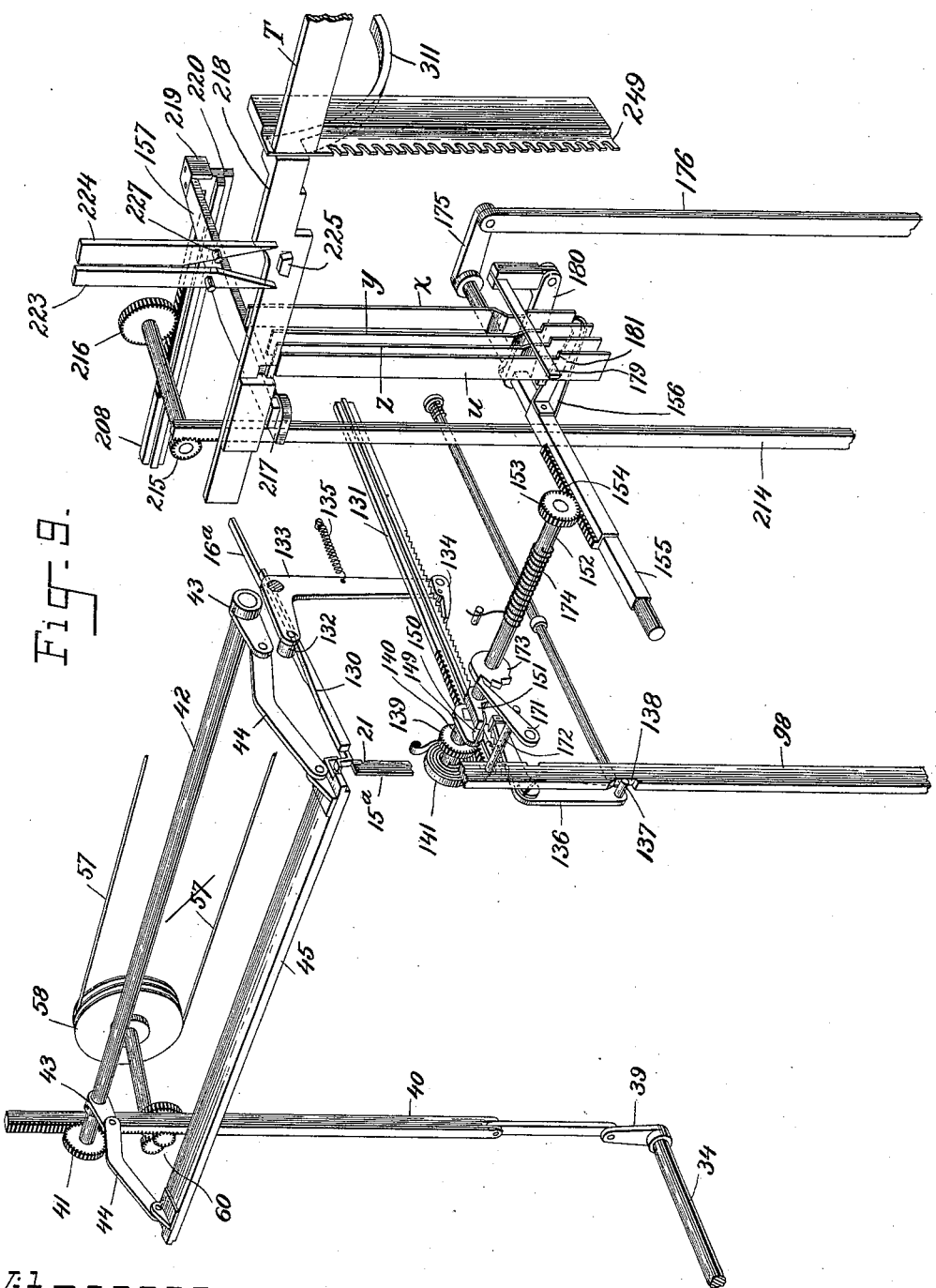
Witnesses.
John F. Nelson
J. G. Hinkel
Inventor
Frank Amos Johnson
by Watson Atty.

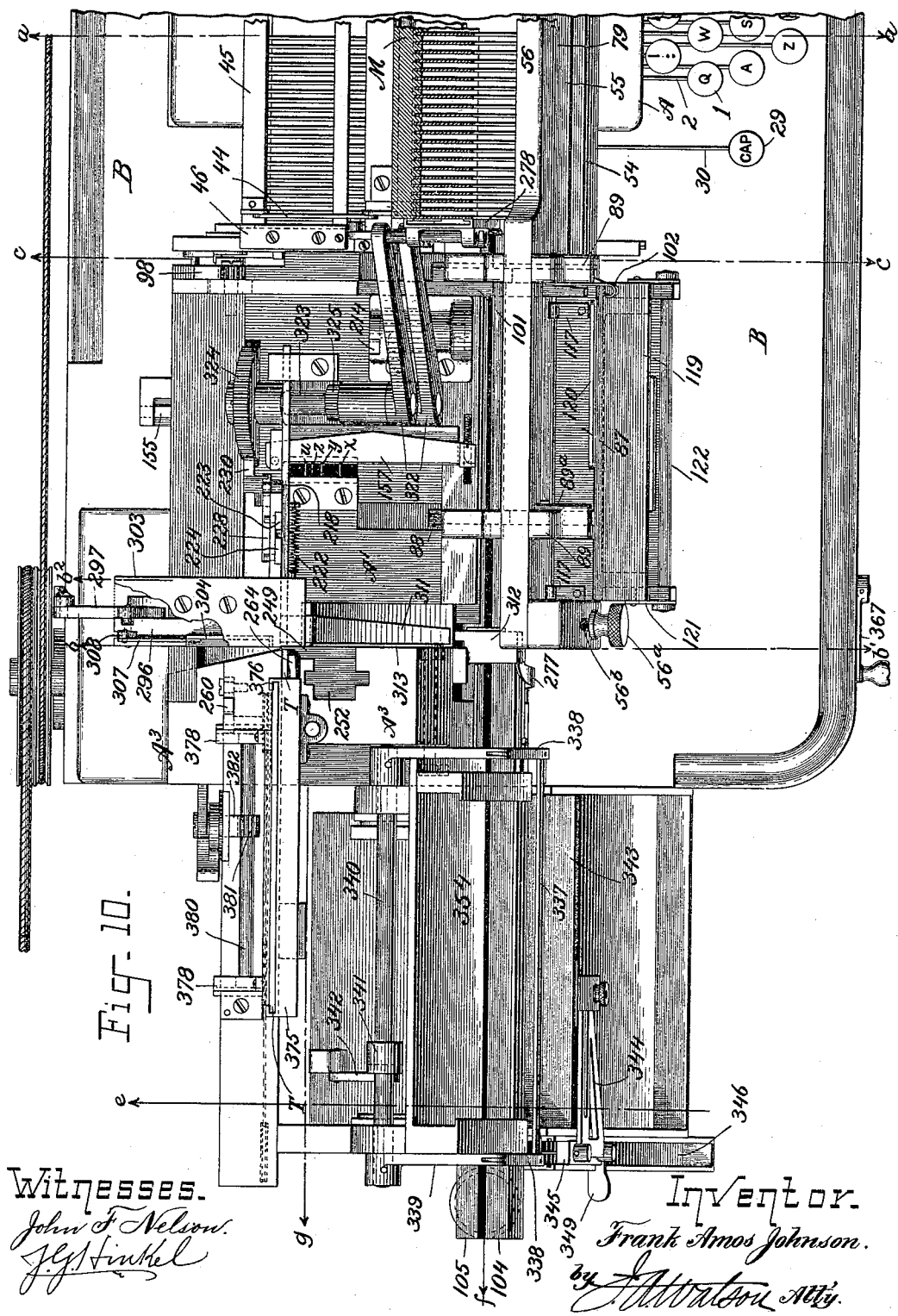

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 8.
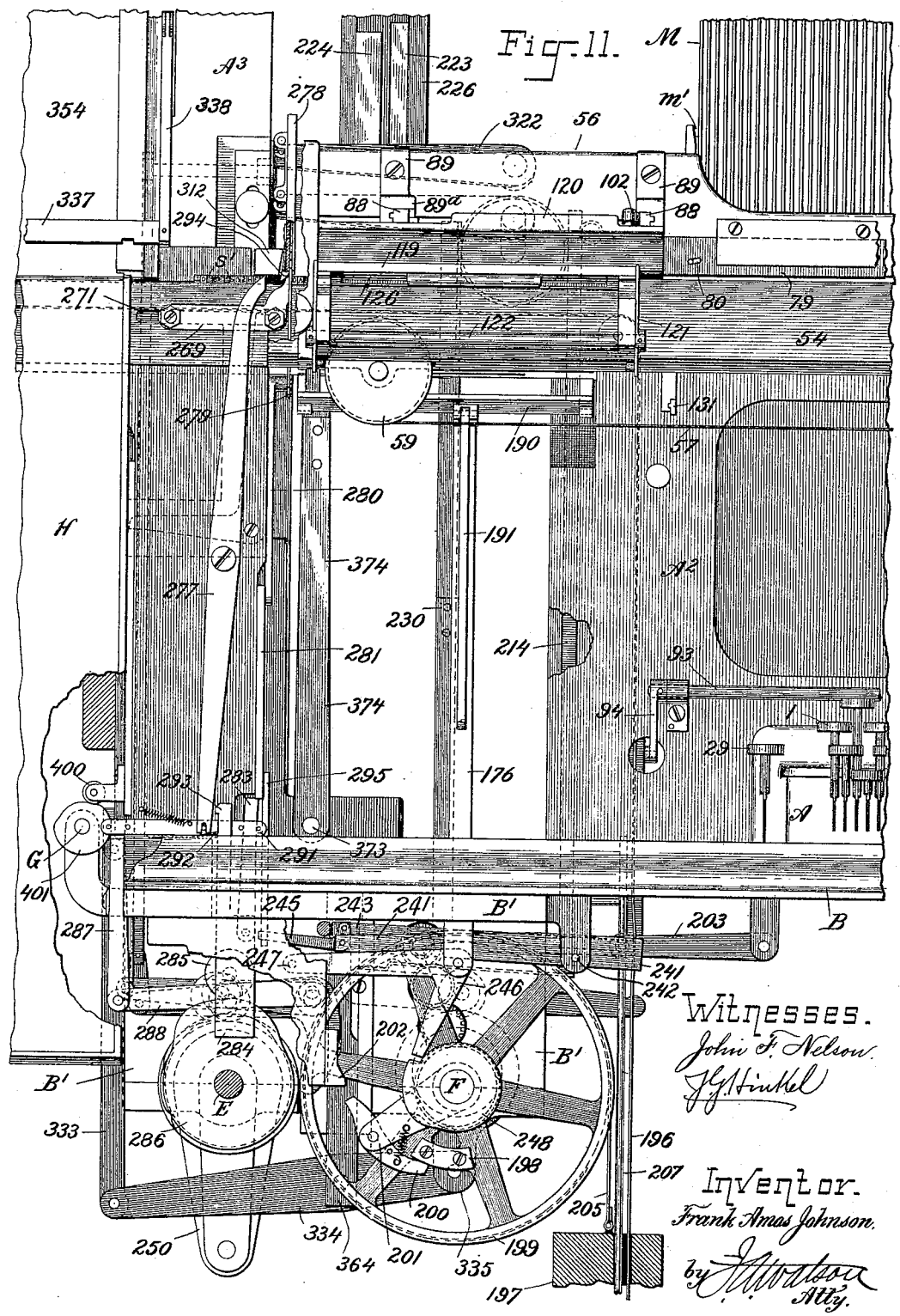

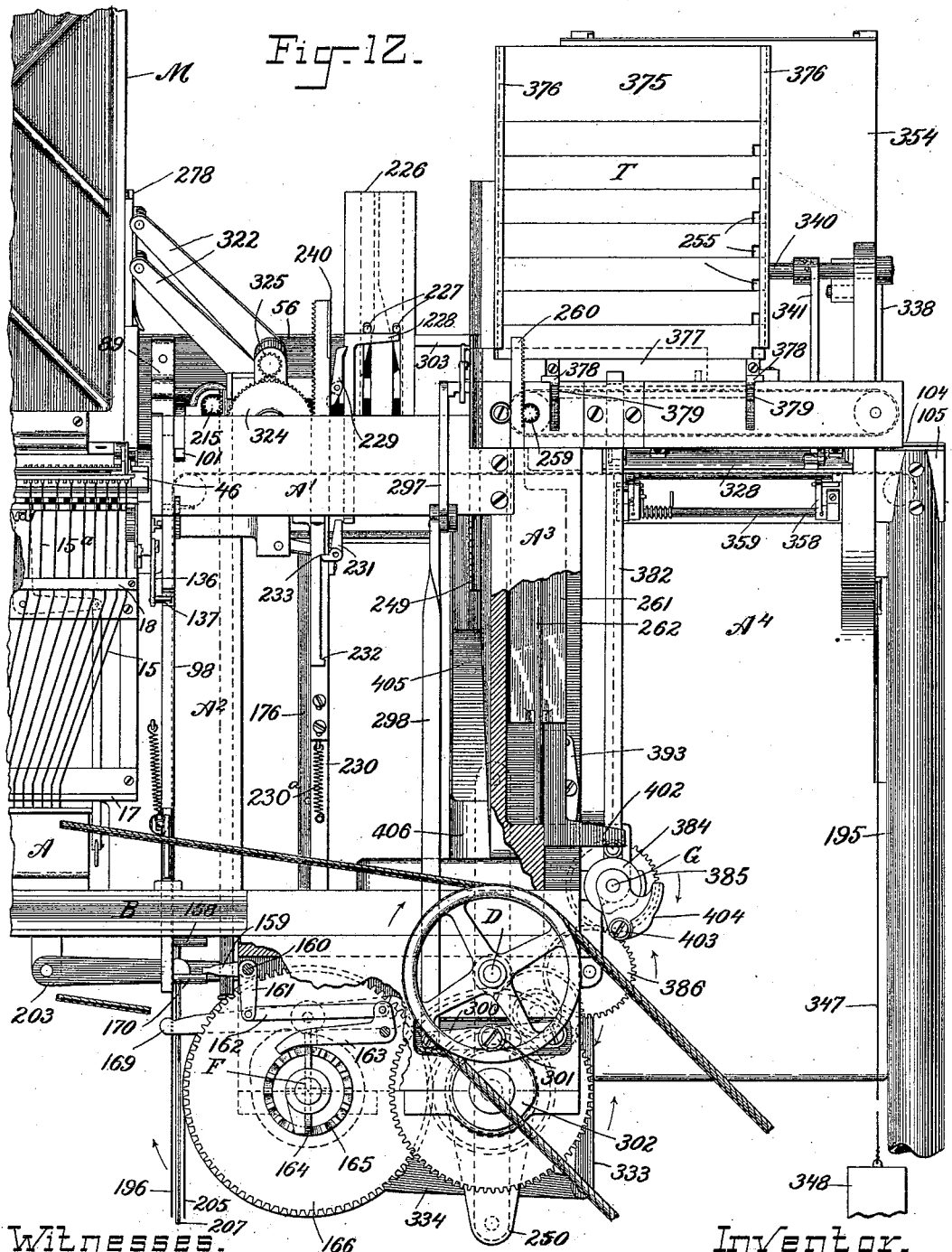

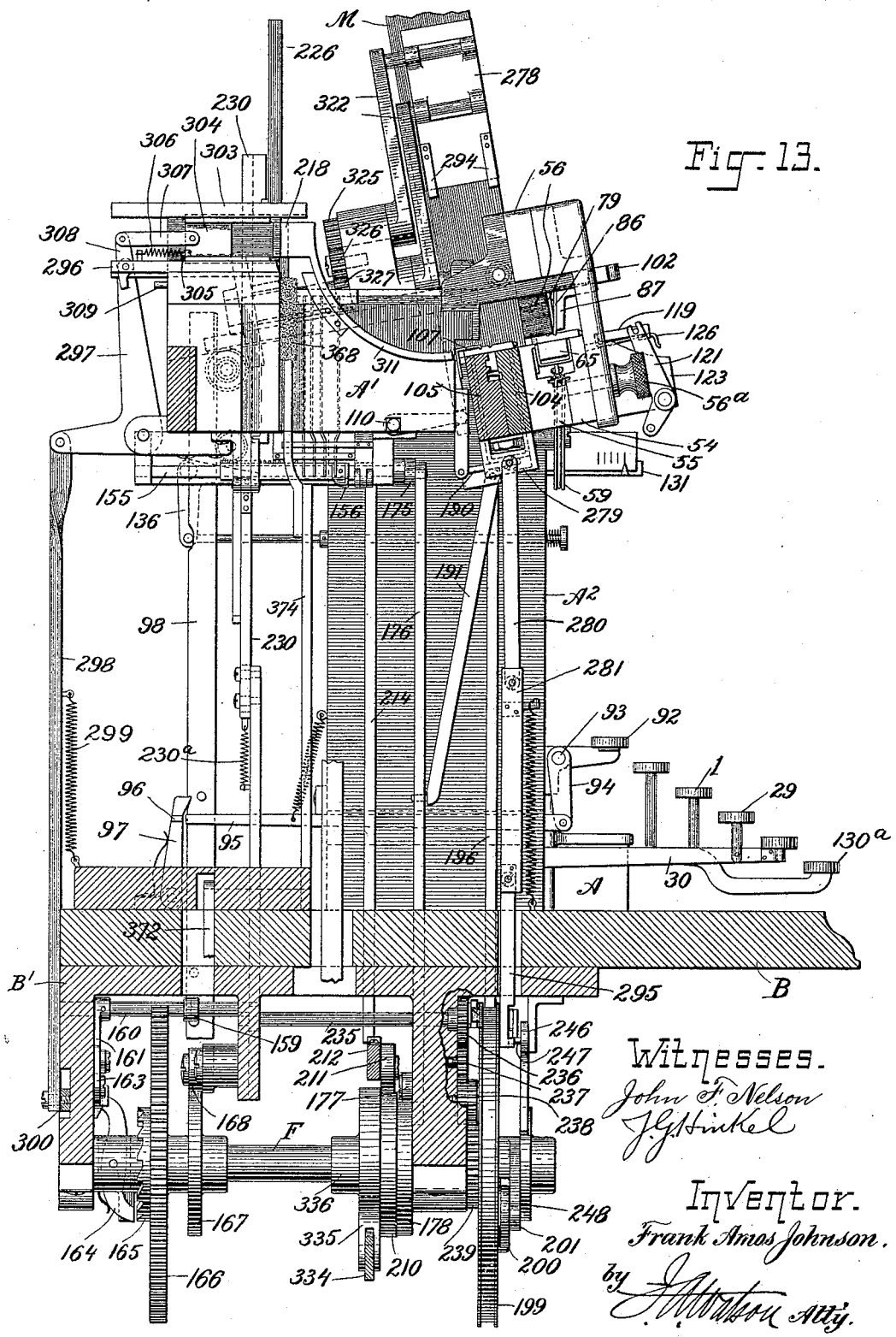

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 11.

Witnesses.
John F. Nelson.
J. G. Hinkel.

Inventor.
Frank Amos Johnson
by J. A. Watson Atty.

THE NORRIS PETERS CO., PHOTO-LITHO., WASHINGTON, D. C.

No. 607,047. Patented July 12, 1898.
F. A. JOHNSON.
TYPE SETTING AND JUSTIFYING MACHINE.
(Application filed May 25, 1897.)

(No Model.) 17 Sheets—Sheet 15.

Witnesses.
John F. Nelson
J. G. Hinkel

Inventor.
Frank Amos Johnson.
by J. A. Watson Atty

No. 607,047. Patented July 12, 1898.
F. A. JOHNSON.
TYPE SETTING AND JUSTIFYING MACHINE.
(Application filed May 25, 1897.)
(No Model.) 17 Sheets—Sheet 17.

Witnesses.
John F. Nelson
J. G. Hinkel

Inventor.
Frank Amos Johnson.
by J. A. Watson Att'y.

UNITED STATES PATENT OFFICE.

FRANK AMOS JOHNSON, OF PHILADELPHIA, PENNSYLVANIA, ASSIGNOR TO THE JOHNSON TYPESETTER COMPANY, OF PORTLAND, MAINE.

TYPE SETTING AND JUSTIFYING MACHINE.

SPECIFICATION forming part of Letters Patent No. 607,047, dated July 12, 1898.

Application filed May 25, 1897. Serial No. 638,116. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in Type Setting and Justifying Machines, of which the following is a specification.

This invention is a machine for setting and justifying lines of type and assembling the lines in a galley. The machine comprises two distinct mechanisms, which are susceptible of being used independently, if desired. In the first mechanism type and temporary word-spaces are selected from a magazine and assembled into lines, which lines are unjustified, being only approximately the desired length or measure. The second mechanism receives the unjustified lines, measures them to ascertain the correct width of the word-spaces necessary to justify the lines, prepares the word-spaces and inserts them in the lines in lieu of the temporary spaces, thus justifying the lines, and finally deposits the justified lines in the galley. The first mechanism may be termed the "type-assembling" mechanism and the second mechanism the "justifying" mechanism.

*Type-assembling mechanism.*—The assembling mechanism, as shown, occupies the right half of the machine. In it there is a magazine having channels for the type and temporary spaces. The lower-case type are arranged in alternate channels, and adjacent to each lower-case channel is a channel for the corresponding upper-case type. The machine is furnished with a keyboard quite similar to that of an ordinary type-writer. The keys normally select lower-case type and set in motion mechanism which pushes the selected type from the magazine onto typeways in front of the magazine. A shifting device, operated by an upper-case or "cap" key, causes the same keys to select upper-case type. Each time a type is delivered onto the ways a type-carrier which reciprocates along the ways conveys the type to the place where the type are assembled into lines at the left end of the ways, which place may be termed the "stick." The connections between the keyboard and the magazine consist mainly of key-levers extending to the rear of the machine, vertical push-rods which are raised by the key-levers, and type-ejecting plungers which are brought into engagement with a common reciprocating bar by means of the push-rods. The reciprocating bar is operated by power, and it carries the selected-type ejectors forward to eject the type and then rearward to their normal positions. The key-touch is very light, as the operator is only required to select the type, the machine automatically performing the work of ejecting the type and carrying it to the stick. These latter movements are imparted from an escape-shaft which is normally at rest, but which is coupled to a constantly-running shaft during a single revolution each time a key is depressed. Two or more type may be selected at one time when the letters are arranged in proper sequence in the magazine. When one or more keys are depressed, it is necessary that the escape-shaft should complete its revolution and restore the parts to their normal positions before additional keys are depressed. This is insured by proper interlocking mechanism which compels the operator to push down simultaneously all the keys selected at one time and which prevents the operation of other keys until after the escape-shaft has completed its movement and the selected type have been carried to the stick. These interlocking devices are to insure safety and exactness in the operation of the machine; but they do not prevent the rapid assembling of the type for the reason that the escape-shaft revolves very quickly. The temporary spaces are preferably contained in the left-hand channel of the magazine. They are slightly longer than the type, and when assembled both ends project beyond the type in the line. This type-assembling mechanism will be described in detail hereinafter.

*Justifying mechanism.* — The justifying mechanism automatically removes the temporary spaces and cuts justifying-spaces from strips or bars of type-metal, herein termed "space-timber," and inserts these justifying-spaces between the words of the lines in lieu of the temporary spaces. The assembled line is first moved bodily from the stick of the assembling mechanism onto the typeways of the justifying mechanism and then clamped between an abutment and a movable measuring-head. The position assumed by the measuring-head is determined by the amount of matter in the line. This head is connected by a justifying-lever with a gage, which determines the width of the final or justifying spaces, one end of the lever being pivoted to the gage and the other end in contact with a knife-edge, which moves with the head. Along the lever are a series of fulcrums which are normally inoperative, one fulcrum being at the middle of the lever, the next at one-third its length from the gage, the next one-fourth its length from the gage, &c. If there is one word-space in the line, the middle fulcrum will be rendered operative and the gage will be moved the same distance as the measuring-head, and the entire amount needed to justify the line will be supplied in a single space. If there are two word-spaces in the line, the second fulcrum will be rendered operative and the gage will be moved only one-half as much as the head, thus dividing the space to be filled into two parts, and so on. To simplify the drawings, only four fulcra are illustrated; but it will be understood that any desired number may be used.

The gage is set once for each line and locked in place while the line is being justified. After the gage is locked the abutment is withdrawn and the line is moved along the ways to the left through the respacing mechanism proper. Each time the projecting ends of the temporary space engage this mechanism the line is stopped temporarily and parted, the portion to the right of the temporary space being moved backward, a piece of space-timber is moved against the gage and a justifying-space cut from the end and inserted into the opening in the line, and simultaneously the temporary space is removed. The line then moves forward to the left, and these operations are repeated each time a temporary space is presented to the respacing mechanism. After the last temporary space in the line has been replaced by a justifying-space the line is carried automatically to the left into position opposite a galley, into which it is automatically moved before the commencement of the respacing of the next succeeding line.

The assembling mechanism and the justifying mechanism are practically independent. As soon as the line is assembled a line-key is touched, which sets the justifying mechanism in operation, and the assembled line is immediately moved from the assembling-stick into the justifier. The operator may then proceed at once with the succeeding line. Provision is made for making corrections in the line before it is justified, and, if desired, the entire line may be removed or one or more lines of hand-set type may be inserted into the stick and transferred to the justifier. It is thus easy to supply odd type or characters which cannot be conveniently carried in the magazine. The lines may be deposited in the galleys either solid or leaded, an automatic leading device being provided.

The invention will now be described in detail, reference being had to the accompanying drawings, in which—

Figure 2:
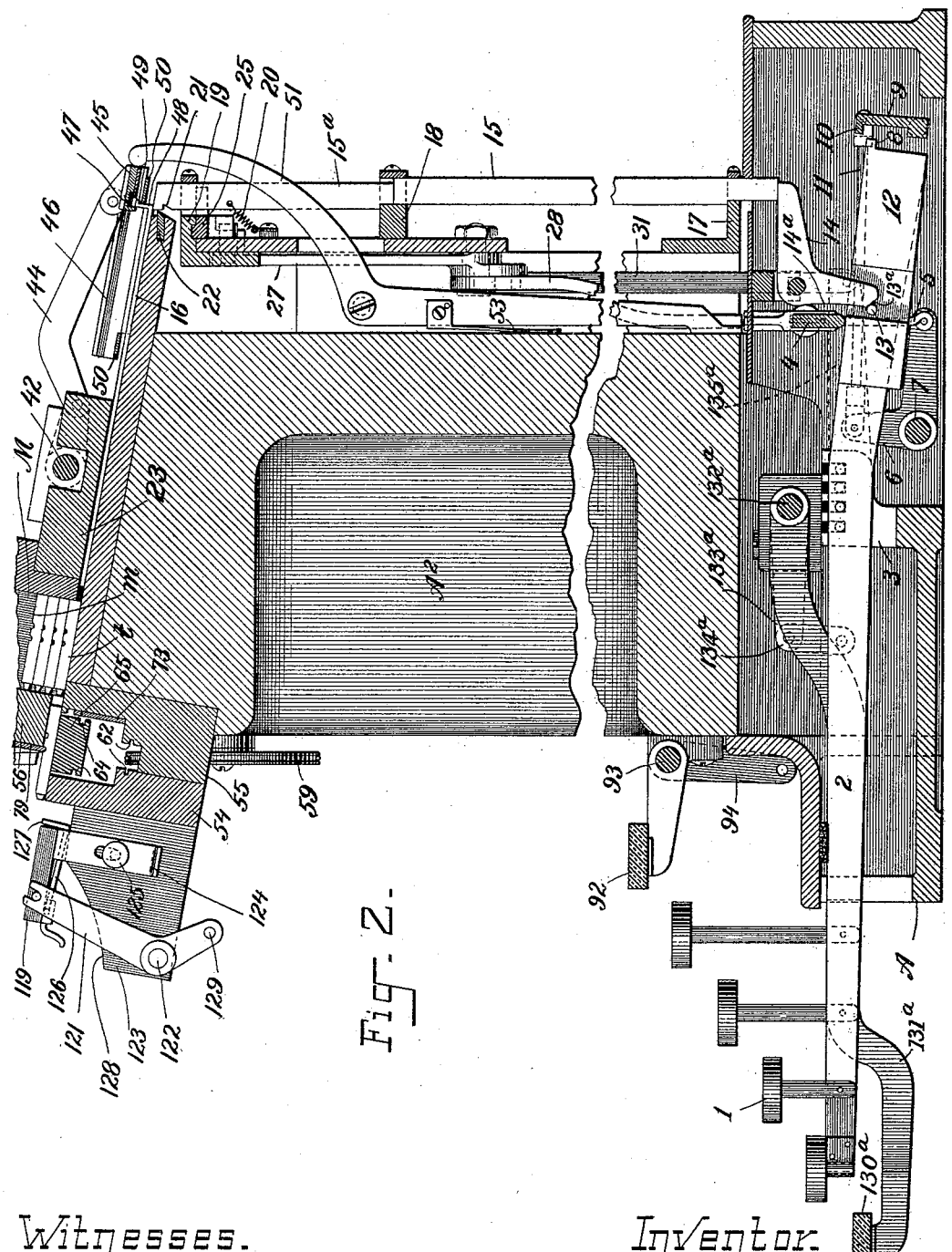
Figure 14:
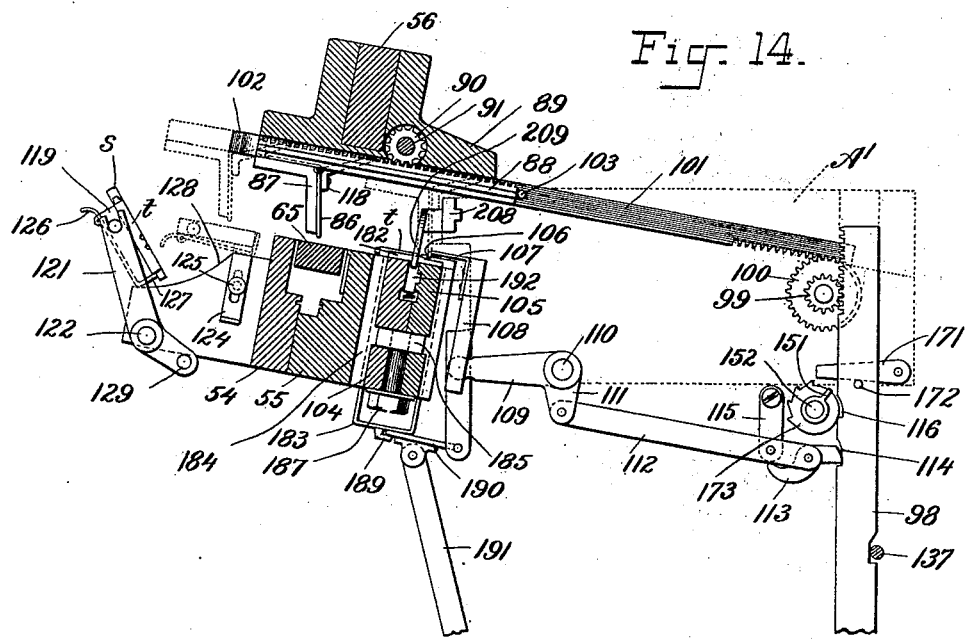
Figure 15:
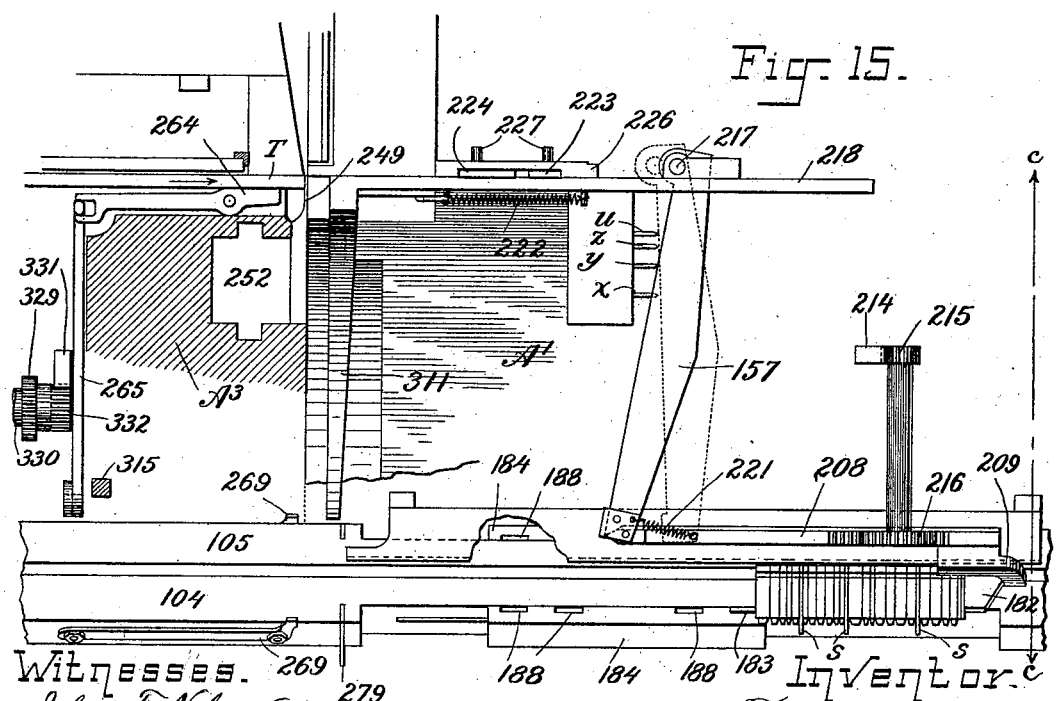
Figure 16:
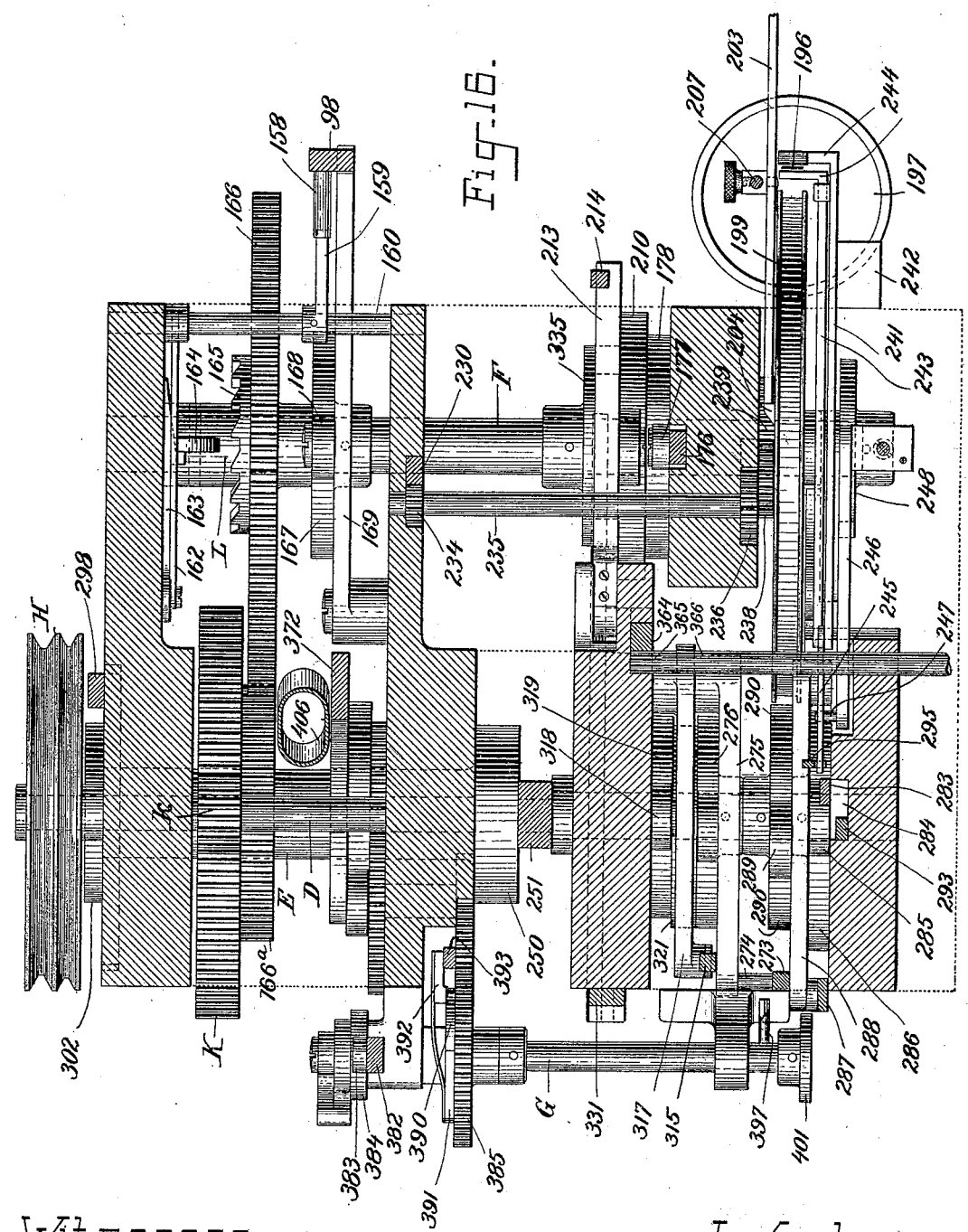
Figure 17:
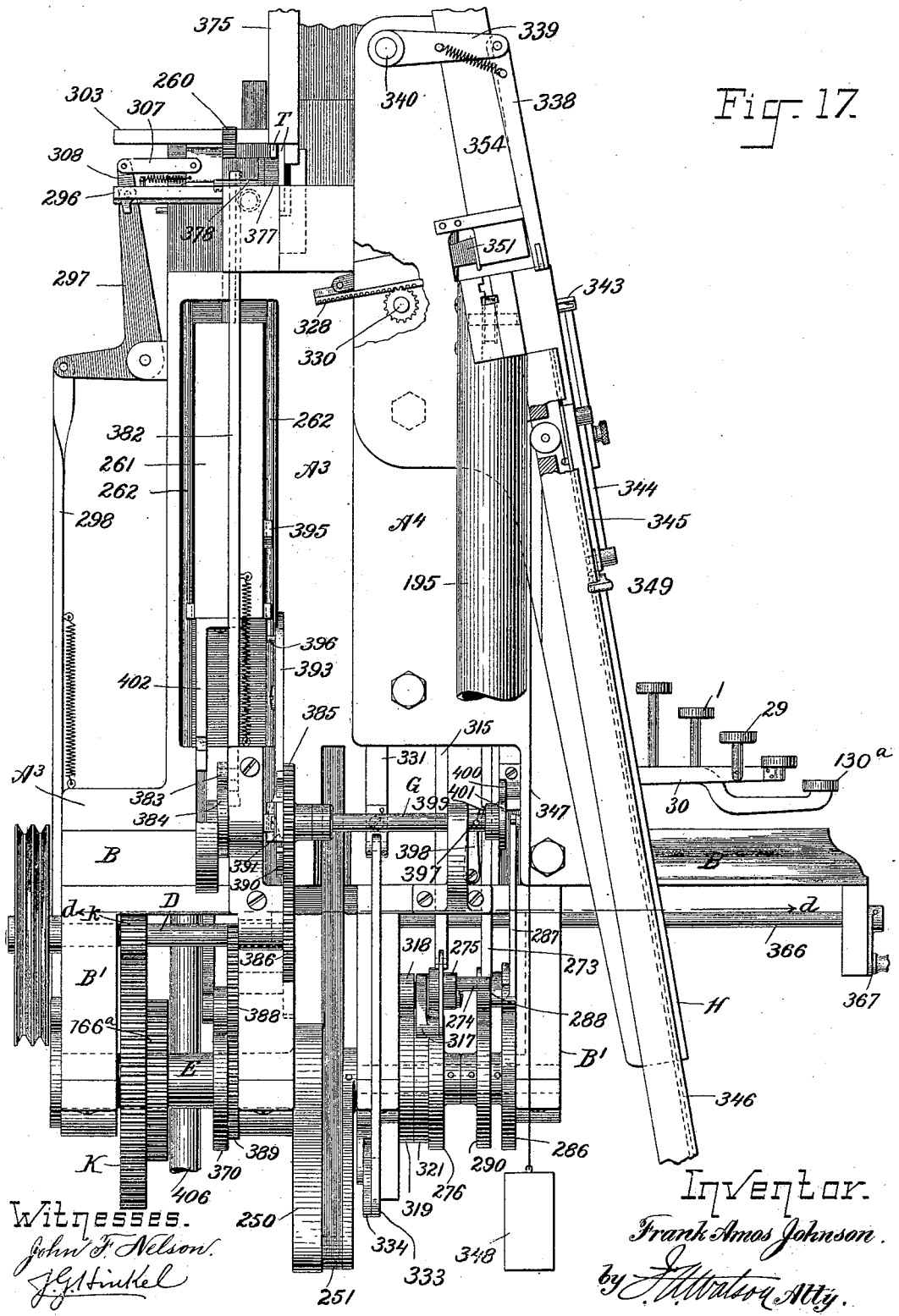
Figure 18:
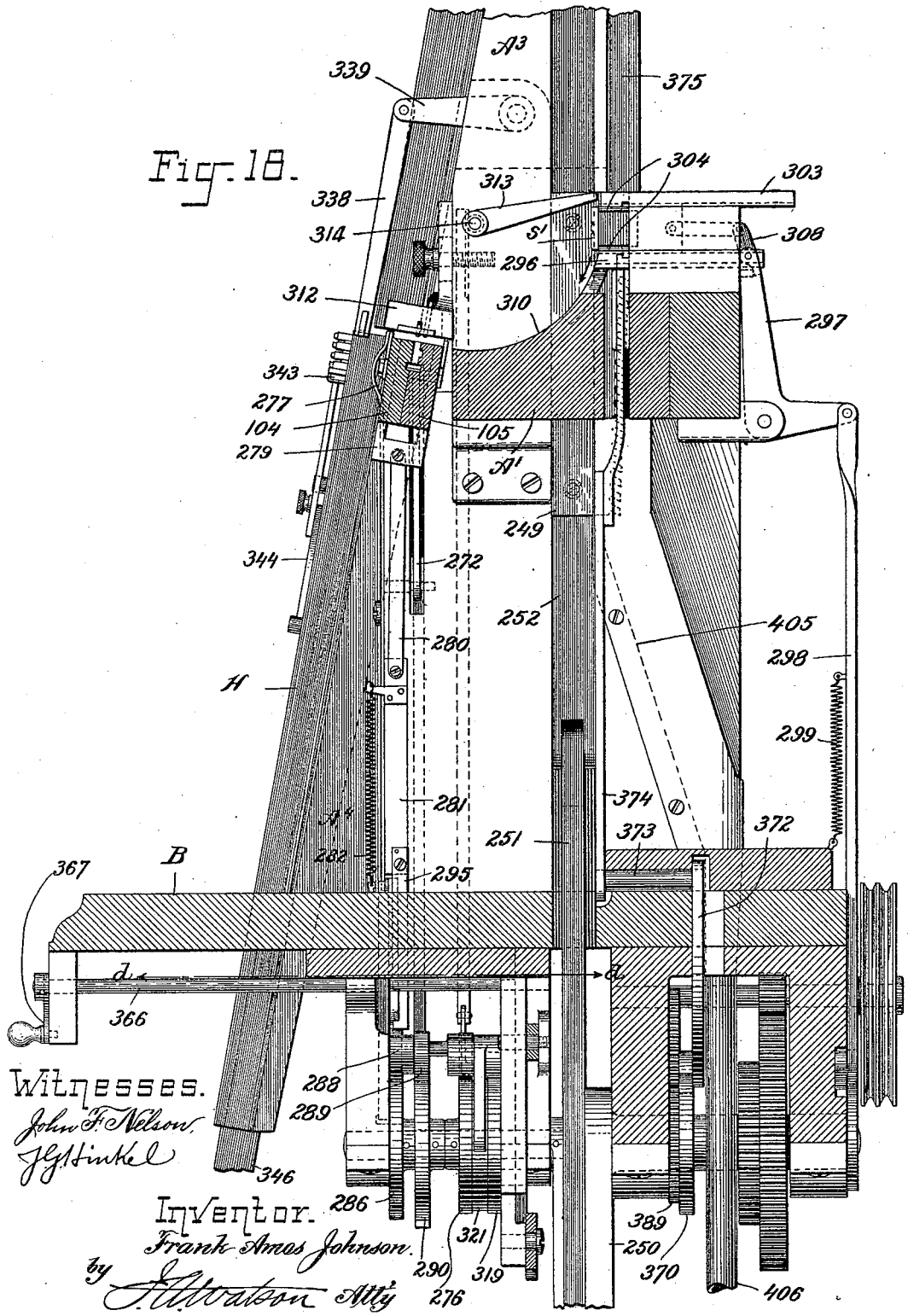
Figure 19:
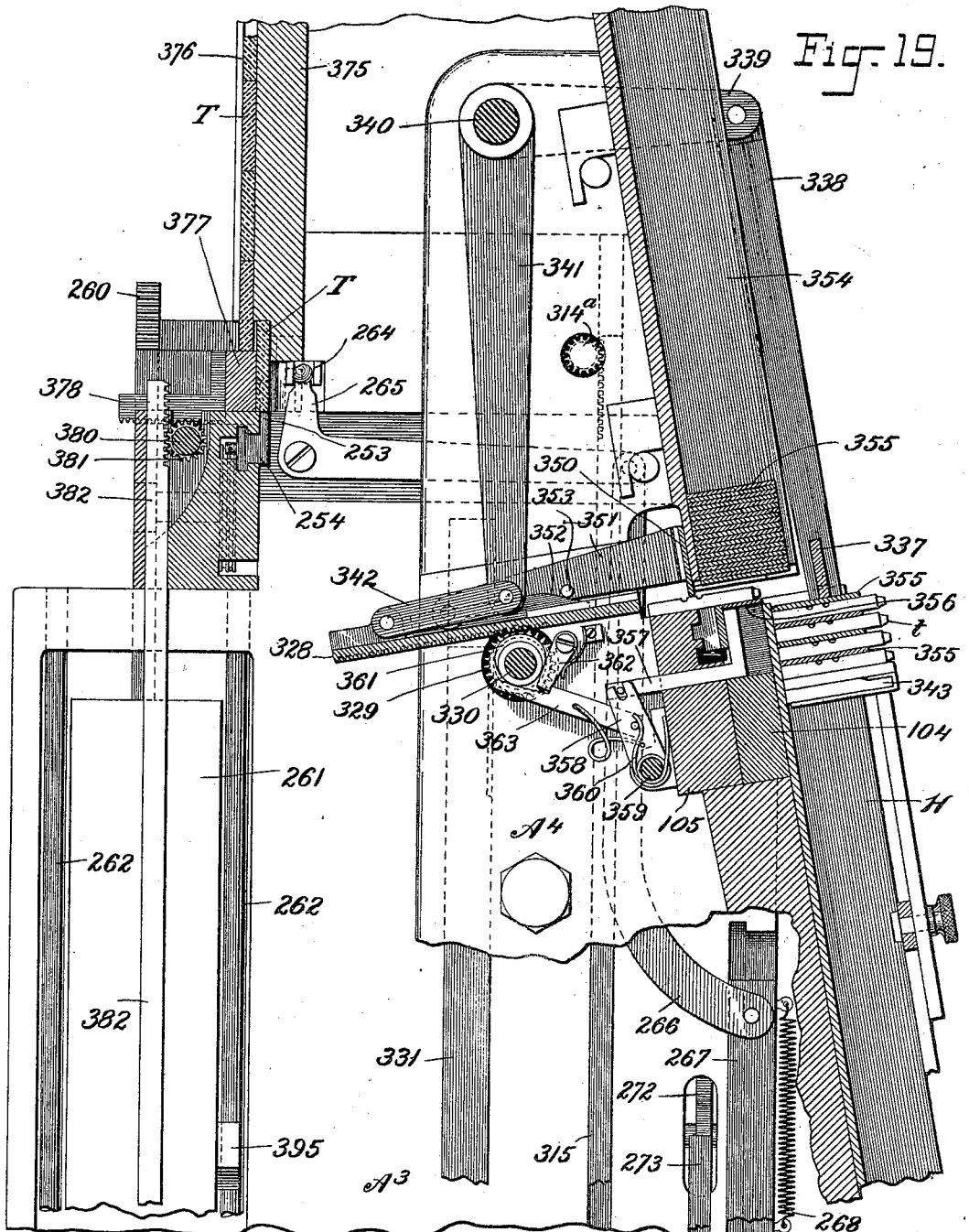
Figure 20:
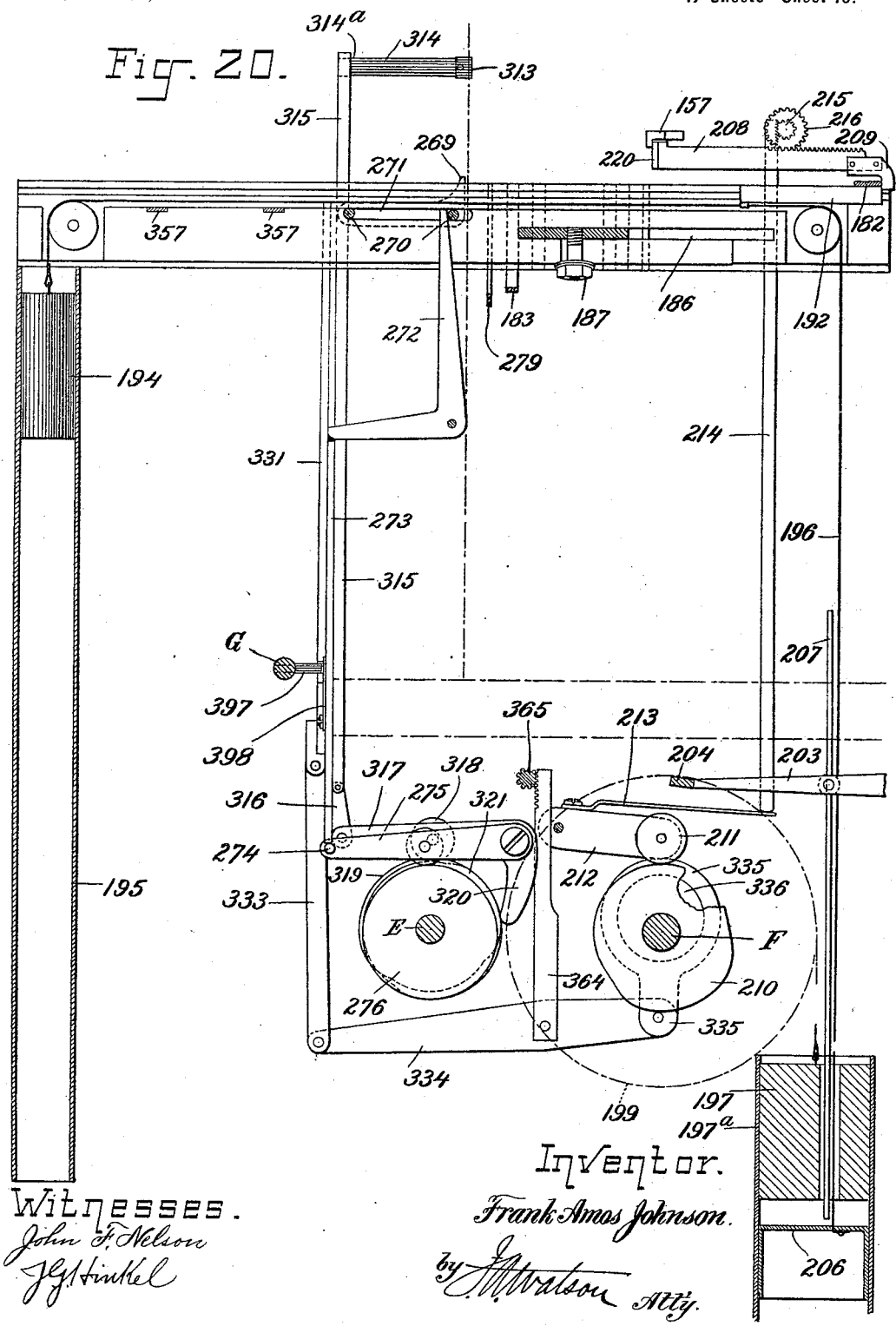
Figure 21:
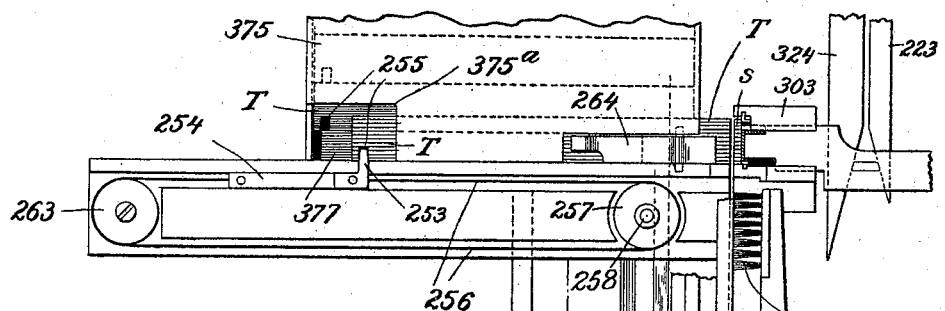
Figure 22:
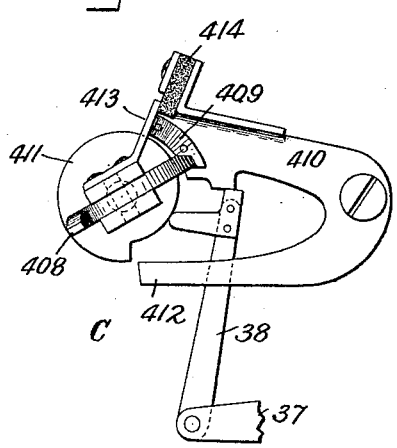
Figure 23:
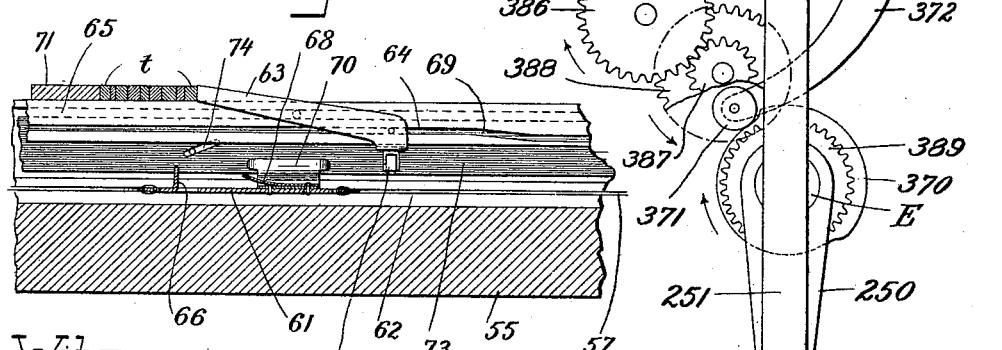

Figure 1 is a perspective view of the machine. Fig. 2 is a vertical section through the keyboard on line $a\ a$, Fig. 10, illustrating the connection between the keys and the type-ejectors. Fig. 3 is a perspective skeleton view of the means for selecting and assembling type, including the interlocking devices and the escape-shaft. Fig. 4 is a detail of the device for shifting from upper to lower case type. Fig. 5 is a left end view of the machine. Fig. 6 is a perspective view of the magazine, illustrating the operation of loading a channel with type. Fig. 7 is a vertical section through the magazine. Fig. 8 is a rear view of the hinge and latch of the upper section of the magazine. Fig. 9 is a perspective skeleton view of part of the type-assembling mechanism and part of the justifying mechanism. Fig. 10 is a plan view of the left end of the machine, showing all of the justifying mechanism and a portion of the assembling mechanism, the magazine being in section. Fig. 11 is a front view of the middle portion of the machine. Fig. 12 is a rear view of the left end of the machine, illustrating the timber-magazine and other parts of the justifying mechanism and part of the assembling mechanism. Fig. 13 is a vertical sectional view looking to the right from line $b\ b'$, Fig. 10. Fig. 14 is an enlarged detail in section on line $c\ c$, Figs. 10 and 15, of the mechanism for transferring lines from the stick to the justifier and also illustrating the means for inspecting and correcting the type. Fig. 15 is a detailed view in plan of the justifying-lever, the gage, the timber, and associated devices. Fig. 16 is a plan view of the mechanism below the base-plate, parts being shown in section on the line $d\ d$, Figs. 17 and 18. Fig. 17 is a left end elevation of the machine, parts being broken away. Fig. 18 is a vertical section taken approximately on the line $b'\ b^2$, Fig. 10. Fig. 19 is an enlarged end elevation, partly in section, on line $e\ e$, Fig. 10, showing the mechanism for depositing lines in the galley. Fig. 20 is a view, partly in section on line $f\ f$, Fig. 10, illustrating the means for conveying the type through the justifying mechanism. Fig. 21 is a view, partly in section on line $g\ g$, Fig. 10, illustrating the operation of the timber-feeding mechanism, the knife, the brush for cleaning the knife, and associated parts. Fig. 22 is a detail of the clutch for setting the escape-shaft in motion, and Fig. 23 is a sectional view illustrating the manner of assembling type on the stick.

The various working parts of the machine are mounted upon a suitable base-plate B. Below the base-plate is a hanger B', provided with several depending bearings, in which the main-movement shafts are hung. Power is applied to the machine by means of a drive-pulley H and belt $h$. From the pulley H a second belt $i$ extends to a pulley I upon the shaft which drives the type-assembling mechanism. The pulleys H and I are constantly rotated during the operation of the machine. The main drive-pulley H is on a shaft D, and power is communicated from this shaft through reducing-gears $k$ K to the main shaft E. This shaft extends across the machine, being divided in the middle and connected through two cranks and a common crank-pin for a purpose which will be explained hereinafter. An intermittent-movement shaft F has power communicated to it from the shaft E through gears 166 $166^a$ and a clutch L. Supported upon the base-plate B is a box or frame A, in which the key-levers are mounted, and standards or brackets $A'$ $A^2$ $A^3$ $A^4$, upon which most of the parts of the assembling or justifying mechanism are mounted.

*Assembling mechanism.*—The assembling mechanism is controlled from a bank of keys 1, connected to key-levers 2, which are fulcrumed in a support 3 in a box A, which rests on the bed-plate B. Above the rear ends of the key-levers is a universal bar 4, which is guided at its ends in grooves in key-box A. The universal bar is connected by rods 5 with elbow-levers 6 on a rock-shaft 7, Figs. 2 and 3.

The rear ends of the key-levers are provided with locking-shoulders 8, in the rear of which is a pivoted locking-bar 9, extending across the entire series of key-levers. The bar 9 is pivoted at its lower edge and provided at its upper edge with a flange 10. The upper edge of the bar is connected by means of bars 11 with arms of the elbow-levers 6. The keys are normally raised by means of counterweights 12 on their rear ends. Pins 13 near the rear ends of the levers operate through elbow-levers 14 to raise two-part push-rods 15 $15^a$, which bring the type-ejectors 16 into operation, as will be hereinafter described. The lower portion 15 of the push-rods are vertically arranged in slotted guides 18 17, and the upper portions $15^a$ move in slotted guides 18 19. The sections $15^a$ are normally drawn forward and downward by springs 20. At their upper ends they stand normally under the rear ends of the lower-case-type ejectors, and they are provided with notches 21, which engage with a ledge 22 and temporarily lock them in a raised position when they are elevated.

The type $t$ are arranged on their edges, nicks up, in suitable channels $m$ in a magazine M. The lower-case type are held in alternate channels and the upper-case type are held in the channels adjacent to their respective lower-case type. There is a type-ejector 16 for each type-channel, which ejectors are arranged to slide in a slotted keeper 23 at the rear of the magazine.

The upper and lower case letters are represented by a single set of keys and key-levers and a corresponding set of push-rods 15. The upper sections $15^a$ of the push-rods are movable laterally at their upper ends, so they can be shifted from their normal position under the lower-case ejectors to a position under the upper-case ejectors. The slots 24 in the upper guide 19 permit the levers $15^a$ to swing laterally from the lower-case to the upper-case type ejectors. As these type-ejectors are spaced variably, depending upon the widths of the different type, the slots 24 are correspondingly varied. Beneath the guide 19 is a slotted shifting-bar 25, having slots 26 which vary in width. The movement given to the shifting-bar 25 is equal to the greatest throw of any of the push-rods $15^a$, and where the throw is required to be less than the maximum the slots 26 are of greater width and the slots 24 of less than the maximum width, Figs. 2, 3, and 4. A few of the characters are used in both the upper and lower case and their corresponding push-rods $15^a$ are not shifted with the others. The shifting-bar 25 is operated by the upper arm of an elbow-lever 27, which is connected to the cap-key 29 through key-lever 30 and connecting-rod 31. A depending leg 28, connected with the elbow-lever 27, stands normally to the right of a post 32 upon the universal bar 4, in which position it does not interfere with the operation of the key-levers and the bar. When the cap-key is depressed, the leg 28 moves over the post 32 and assumes a position on the left of it when the cap-key is fully depressed. This device insures the push-rods $15^a$ being wholly under either the lower-case or upper-case type ejectors when the type-levers are operated. In other words, a type-lever cannot be operated while the push-rods are being shifted, Figs. 2 and 3. At the right end of the machine is a constantly-running shaft 33, and in line with it is an escape-shaft 34, which is normally at rest and which is connected with the running shaft 33 at intervals by means of a clutch C.

Upon the end of shaft 33 is a crown ratchet-wheel 407, and centrally pivoted on the adjacent end of escape-shaft 34 is a pawl 408, which seeks engagement with the ratchet-wheel, but is normally held out of engagement by a cam-surface 409 upon a lever 410. When the lever is raised, the pawl is freed and engages with the ratchet-wheel and the escape-shaft immediately begins to revolve. As the escape-shaft revolves a cam 411 strikes an arm 412 of lever 410 and draws said lever down, so that at the termination of a single revolution the pawl is thrown out of engagement by the cam 409 and the escape-shaft permitted to stop. To insure the stoppage of the shaft at the proper point, an arm 413, attached to the shaft, strikes against a stop 414, carried by the arm 410. The tripping-arm 38, which raises the lever 410, is thrown out of engagement with said lever by the cam 411 before the cam takes effect upon the arm 412 to draw the lever down, as illustrated in Fig. 22.

When the clutch is operated, the escape-shaft 34 is connected with the running shaft 33 and after making a single revolution is automatically disconnected, as described. The clutch is tripped by the key-levers through the universal bar 4, the rock-shaft 7, arm 35, levers 36 37, and tripping-arm 38. A crank 39 on the forward end of the escape-shaft reciprocates a rack 40 vertically, Figs. 3, 5, and 9. In mesh with teeth upon the rear of the rack 40 is a pinion 41 upon a rock-shaft 42, which is connected by means of arms 43 and links 44 with a type-ejector bar 45, Figs. 2, 5, and 9. The bar 45 has slotted end guides 46. In the lower face of the bar 45 is a rectangular groove 47, which is undercut at its rear edge, Fig. 2. This groove stands normally over the upturned rear ends 48 of the type-ejectors, which ends have rearwardly-projecting rectangular lips 49. The type-ejectors 16 are of spring metal, permitting their rear ends to be raised into engagement with the ejector-bar by the push-rods. When a key-lever is depressed, the pin 13 on its rear end operating upon a cam-surface $13^a$ gives the bell-crank 14 and the push-rods sufficient movement to raise the rear end of the corresponding type-ejector into engagement with the ejector-bar. This movement takes place during the first part of the movement of the type-lever. In continuing its movement to trip the escapement the pin 13 follows the curved forward edge $14^a$ of the elbow-lever 14 without imparting further movement to said lever. This construction limits the upward movement of the push-rods and insures them being raised before the escapement-shaft is set in motion. As soon as the escape-shaft starts the ejector-bar begins to move forward and the lip 49 engages the undercut portion of the groove, thus locking the ejector to the bar during its forward movement. During its rearward movement the flange at the forward side of the groove 47 engages the portion 48 of the ejector and draws it back to its normal position. The extreme movement of the ejectors is limited by front and rear stop-bars 50, attached to the end guides 46, Figs. 2 and 10. The rock-shaft 42 has a movement of one hundred and eighty degrees back and forth, the effect of which is to start and stop the ejector-bar gradually.

The lower end of a safety stop-lever 51, Figs. 2 and 3, normally stands in front of a post 52 upon the universal bar 4. The spring 53 tends to hold the lower end of the lever directly over the post 52, and it is normally held in front of the post by the engagement of the upper end of the lever with the bar 45, the latter being normally in its rear position. Immediately after the escape-shaft is set in motion the bar 45 is moved forward, permitting the lower end of lever 51 to come against the post 52. If the depressed key be released before the completion of the movement of the escape-shaft and the return of the ejector-bar, the lower end of lever 51 will spring out and stand over the post 52, thus preventing a second key from being operated until the escape-shaft has fully completed its movement for the preceding key. This prevents any type-ejector being raised into the path of the ejector-bar excepting when the latter is at rest in its rearward position.

The type are assembled upon ways 54 55 in front of the magazine and beneath the rail or cap-piece 56. They are carried along the ways to the stick or point of assemblage by a pair of type-carrier fingers 63, which are driven back and forth along the ways by engagement with a driver 61, connected with a belt 57. The belt 57 passes several times around and is connected to a driving-sheave 58 at the right-hand end of the typeways. At the other end the belt passes around an idle sheave 59. The sheave 58 is driven backward and forward by a train of multiplying-gears 60, one of which is in mesh with teeth on the rack-bar 40, Figs. 2, 3, 9, and 23.

The type-fingers 63 are connected, forming a yoke, and on their inner faces are pins which engage with grooves 64 in a guide-bar 65, which is included between the fingers. Upon the base of the type-driver 61 there is a post 66, which engages with a depending arm 67 upon the type-finger yoke to insure the fingers being carried backward. The fingers are moved positively forward and to the left by the engagement of the arm 67 with a spring-pawl 68. This pawl operates on the arm 67 while the type-carrier fingers are passing the magazine. After they have passed the magazine the arm 67 is raised out of engagement with the pawl 68 by inclined or cam portions 69 of the groove 64, after which the arm 67 is engaged and held yieldingly by a pair of spring-plates 70 upon the driver. In assembling a line of type the first type is carried by the fingers against a stop-block 71, Figs. 3 and 23, which may be made adjustable for varying the length of the line.

The driver for the carrier-fingers has a uniform amount of travel, but the fingers are permitted to slip from the spring-clamp 70 and stop at any point along the assemblage portion of the ways, being carried frictionally by the springs. As the line is being assembled the carriers carry each type into the line against the preceding type and then stop, the arm 67 slipping through the springs 70 and permitting the driver to pass on to the end of its travel. As the driver returns the springs engage the arm 67 and carry the type-fingers back. The post 66 on the driver insures the fingers always being carried back to the initial end of the ways.

The rear type-carrier finger has a pin 72, which rides on a rail 73, having inclined slots 74, which engage with pins upon the rear typeway 55. The rail 73 is raised by a longitudinal movement just before the type-fingers start to the left or forward, thus bringing them above the typeways to engage with the ejected type, and they are lowered as they retreat by a reverse movement of the rail. The rail is reciprocated by an arm 75 on the rock-shaft 76, which shaft is operated by a cam-lever 77 and a cam 78 on the escape-shaft 34.

Above the typeways and mounted on the front face of the rail 56 is a primary nick-guide 79, Figs. 2 and 3. This nick-guide is provided with inclined slots 80, which engage pins on the cap-rail 56, and it is given a slight vertical movement by reciprocating it longitudinally. The nick-guide is moved by means of the link 81, arm 82, rock-shaft 83, cam-lever 84, and a cam 85 on the escape-shaft 34, Figs. 2, 3, and 5. The movement of the nick-guide is timed so that it rises before the type is ejected and falls just before the type reaches its proper position on the ways. It thus offers a slight frictional resistance to bring the type to rest and prevents them from being carried too far forward by inertia. As a type reaches the desired position on the ways the guide drops into the forward nick and rests in this nick until the type is carried to the stick or place of assemblage. The cap-rail 56 is vertically adjustable to adapt the opening between it and the ways for different sizes of type. As shown, the rail is attached by means of thumb-screws $56^a$, passing through slots $56^b$ in the arms which support the rail, Figs. 1, 10, and 13.

The primary nick-guide 79 is located in front of the magazine. In line with this nick-guide and over the assemblage portion of the ways at the left of the magazine is a nick-guide 86, connected with a laterally-movable angle-bar 87, Figs. 13 and 14. The lower edge of the angle-bar is normally in line with the lower face of the cap-rail 56. This angle-bar is connected to a pair of racks 88, which slide in grooves in a pair of blocks 89, which are fastened to the cap-rail 56. The angle-bar is therefore vertically adjustable with the cap-rail to accommodate different sizes of type. The slides 88 are given a parallel movement by means of pinions 90 on a shaft 91. On touching the starting-key 92 after the line is assembled a shaft 93 is rocked and an arm 94 pushes rearward a rod 95, striking a lug 96 on a spring-latch 97, which releases a weighted slide 98. As the slide 98 drops a rack at its upper end operating through pinion 99 and gear 100 draws back a rack 101. On the forward end of rack 101 is a spring-latch 102, between which latch and a pin 103 one of the racks 88 is included. As the slide 101 is drawn back the two racks 88 are carried with it, and the assembled line of type is carried rearward by the transfer nick-guide 86 from the position shown in full lines in Fig. 14 to the position shown in dotted lines over the typeways 104 105 of the justifying mechanism.

Over the justifier-typeway 105 is a retaining nick-guide 106 on the forward edge of an angular plate 107, which is carried by slides 108 in the forward face of the bracket A'. These slides are given a vertical movement by means of arms 109 upon a rock-shaft 110. The rock-shaft is operated by an arm 111 and a link 112. Upon the rear end of the link is a pivoted pawl 113, the rear end of which rests in a cam-notch 114 in the weighted slide 98 when the slide is in its uppermost position. The rear end of the link 112 is hung upon a smaller link 115, Fig. 14. As the weighted slide 98 begins to fall the cam-notch 114 operates through the parts mentioned and raises the retaining nick-guide 106. As the slide continues down the line of type is transferred to the justified typeways 104 105, the rear nicks going under retaining nick-guide 106. Just before the slide 98 reaches its lowest position the pawl 113 drops into a notch 116, thus permitting the nick-guide 106 to descend and enter the rear nicks. The pawl 113 permits the raising of slide 98 without raising the retaining nick-guide. The upward movement of the slide 98 carries the angle-bar 87 and nick-guide 86 forward. The nick-guide 86 when in its rearward position is free to swing on its pivot, and hence it readily raises itself from the nicks in the type in beginning its forward movement, it being pivoted at its upper edge to spring-hinges 117 upon the angle-bar 87, Figs. 10 and 14. Before reaching its forward position over the assembling-typeways an arm 118 engages a lip $89^a$ on the left-hand block 89, and the guide is thus brought positively down into alinement with the primary nick-guide. The spring-hinges 117 permit the guide 86 to yield in case a type comes to it in such a position that the nick will not register with the guide. This may happen when a type is inverted or upset upon the assembling-typeways.

Provision is made for the removal of a line from or insertion of a line into the assemblage portion or stick of the typeways. It is sometimes desirable to correct errors before the lines are justified and sometimes necessary to insert type or characters which are not found in the magazine. To provide for such changes and corrections, the type may be withdrawn from the stick onto a movable table termed an "inspecting-stick" 119, Figs. 2, 10, and 14. The inspecting-stick stands normally, as shown in Fig. 2, with its upper surface in the plane of the typeways. The type are transferred to it by pushing the spring-latch 102 to the left, which releases the slides 88, and drawing the slides and the transfer nick-guide 86 forward by means of a suitable handle, such as the flange 120. This movement draws the assembled type onto the inspecting-stick 119. The nick-guide is held in engagement with the nicks by means of the arm 118 and lip $89^a$ above referred to. For convenience of inspection the temporary stick can be tipped to a suitable angle, as shown in Fig. 14. The forward edge of the stick is pivotally supported in arms 121, which are connected by shaft 122, supported in brackets 123. The rear edge of the inspecting-stick is supported adjustably by a bracket 124 and screw 125. Beneath the stick 119 is an angular plate 126, which has a vertical flange at the rear end of the stick. When the stick is pressed down, the flange 127 forms a ledge which supports the type and temporary spaces $s$, the spaces having notches at their rear ends, which the flange enters. The arms 121 are then drawn forward and the angle-plate 126 rides over circular cam-faces 128 on the brackets 123. The arms are prevented from moving too far by pins 129, which engage the lower edges of the brackets. This movement brings the stick into the position shown in Fig. 14, which is best adapted for inspecting the type and making corrections. If desired, the stick may be removed entirely and held in the hand like an ordinary printer's stick. After the desired corrections have been made the stick is moved back into the position shown in Fig. 2 and the line then retransferred into the typeways by pushing the transfer nick-guide back until the spring-latch engages the slide 88.

Considerable importance is attached to the construction above described, which permits of readily making changes or corrections in the lines as they are delivered from the setting mechanism and before they are transferred to the justifying mechanism. If desired, lines which have been partly set by machine can be finished by hand in order to insert characters with which the machine is not supplied, or lines may be partially set by hand and finished in the machine. In some cases it may be desired to insert one or more lines of italics or other type which may not be found in the magazine. Such lines can be assembled by hand, of approximately the proper length, and then placed in the machine and transferred to the justifying mechanism. Corrections of any kind may also be made quickly at this point before the lines are justified.

The left-hand channel $m'$ of the magazine contains the temporary spaces $s$, which are preferably constructed of steel and longer than the type, so that they will project beyond the type at both ends. The spaces are ejected by an ejector $16^a$, operated from space-key $130^a$ through levers $131^a$, rock-shaft $132^a$, arm $133^a$, link $134^a$, lever $135^a$, and one of the push-rods 15 $15^a$, as shown in Fig. 2. Upon the space-ejector is a wedge-cam 130, which operates a word-counting rack 131 through the medium of a roll 132, elbow 133, and pawl 134. The pawl stands normally out of engagement with the teeth of the rack, but when the space-ejector is moved forward it engages with the rack and moves it rearward. The pawl is normally held in the forward position by the spring 135, Fig. 9. As the rack 131 is fed rearward it is retained by an angular pawl 136, having in its lower arm a pin 137, which rests normally in a cam-notch 138 in the line-shifter slide 98. The rack 131 through pinion 139 rotates a shaft 140 against the tension of a spring 141, which spring returns the rack to its normal position when released.

For convenience in charging the magazine M it is provided with a movable portion M', having channels which register with the channels of the magazine proper when in its normal position, as shown in Fig. 7. The section M' is connected to a bracket 142 by means of suitable hinges 143, Figs. 6, 7, and 8, and the bracket 142 is pivoted to the magazine M by a suitable pivot-joint 144. The section M' is fastened in its normal position by a latch 145. On raising the latch 145 the magazine can be swung backward to the position shown in Fig. 5 against the bracket 142. The bracket 142 may then be revolved on its pivot until the section M' reaches the position shown in Fig. 6, which is nearly horizontal, and a convenient position for the insertion of a fresh supply of type. The type are temporarily sustained in the magazine-section M' by sliding pins 146. The type are stored in rectangular sheet-metal trays 147, consisting of a bottom, one side wall, and one end wall. The type-trays are approximately of the same length as the channels in the case M', and to load one of the channels the end of the type-tray is made to register with it, and the type will then slide from the tray into the channel. Fig. 6 shows a column of type being thus inserted. For convenience in registering the tray with the channel the upper ends of the partitions 148 are cut away, as at $148^a$, forming recesses into which the ends of the type-trays fit when the trays register with the channels. After the movable section of the magazine is loaded it is swung upward on the pivot 144 and then forward on its hinges into its normal position and locked in this position by latch 145. When the type are nearly exhausted from a channel of the lower magazine-section, the column of type from the upper section is lowered to fill the lower channel by pressing its sustaining-pin 146 back by means of any suitable instrument held in the hands and then lowering the column by hand until it rests on the remaining type in the channel. As the magazine is inclined rearwardly, there is no tendency for the type to fall forward or work out.

*Line-measuring devices.*—The shaft 140, which is operated by the word or space counting rack 131, has on its left-hand end a crank-arm 149 and crank pin or blade 150, which as it revolves carries with it a crank 151 on the rock-shaft 152. On the left end of shaft 152 is a pinion 153, engaging with a rack-sleeve 154, which embraces and slides on an angular rock-shaft 155. The sleeve 154 carries an interponent-arm 156, which normally travels under the lower ends of a series of fulcrum-bars $x\ y\ z\ u$. These fulcrum-bars are evenly spaced at their lower ends and the interponent moves the distance between them as each word-space is counted. The upper ends of the fulcrum-bars extend to the left of and just below a justifying-lever 157, and they are spaced unevenly. The bar $x$ divides the lever in the ratio of two to one, the bar $y$ in the ratio of three to one, the bar $z$ in the ratio of four to one, &c. If desired, a bar may be used in front of $x$ to divide the lever into two equal parts, and other bars may be used in the rear to divide it into parts having a greater ratio. In composing a line, as illustrated, no provision is made for justifying only two words and one word-space in a line, although this may be accomplished by adding the fulcrum-bar referred to in front of the bar $x$. In the construction shown the interponent 156 moves under the fulcrum-bar $x$ as the second word-space is ejected into the line, then under the bar $y$ as the third word-space is inserted, &c. When the line is completed, the interponent stands under the fulcrum-bar corresponding to the number of word-spaces in the line. The line-key 92 is then operated and the line-starting slide 98 released, Figs. 9 and 13. As the slide descends a pin 158 strikes an arm 159 on the rock-shaft 160, and arm 161 on said shaft through link 162 raises a cam-lever 163, which releases a pivoted pawl 164, permitting it to spring into engagement with a crown ratchet-wheel 165 on the constantly-rotating gear 166, Figs. 12 and 13. The pawl 164 is mounted in a slot in the end of the movement-shaft F. As the shaft starts a cam 167 immediately operates on roll 168, raises arm 169, and lifts the weighted rod 98 to its initial position, (shown in Fig. 13,) in which position it is retained by the pawl 97. As the slide 98 rises the pin 170 strikes the arm 159 and through the connections 161 162 throws the cam-lever 163 into the path of the pawl 164, which pawl is engaged and thrown out of action at the completion of one revolution, Figs. 12, 13, and 16. As the slide 98 descends a pawl 171, which is normally sustained by an arm 172, is dropped into engagement with a ratchet-wheel 173 upon shaft 152 to hold said shaft against the tension of the return-spring 174 after the word-counting rack is released. The further movement of slide 98 by means of the cam-notch 138 throws the pawl 136 out of engagement with the word-counting rack and permits the rack to return to its initial or forward position under the influence of spring 141. Immediately after the shaft 152 is locked by pawl 171 the shaft 155 is rocked to raise the selected fulcrum-rod into operative position by means of an arm 175, slide 176, cam-roll 177, and cam 178 on movement-shaft F. As the slide 176 falls the raised fulcrum-bar is drawn positively down by means of a returning finger 179, carried by an arm 180, Fig. 9, the finger standing over the shoulders 181 upon the fulcrum-bars. The line of type after being transferred to the justifying typeways 104 105, as above described, is automatically measured between a follower-head 182 and a yoke-shaped abutment 183, Figs. 13, 14, 15, and 20. The abutment proper, 183, is a yoke-shaped slide having two branches, one on each side of the justifier-typeways. This yoke is carried by an adjustable abutment-holder, composed of front and rear pieces 184 and the connecting-piece 185, which extends through a transverse slot 186 in the typeways. The abutment-holder is capable of longitudinal movement upon the typeways, and it can be clamped at any desired point by means of a suitable clamping-screw 187, which bears upon the lower edges of the typeways and engages the transverse portion 185. In order to provide a maximum adjustment for the abutment to adapt the machine for lines of various lengths, the abutment-holder is provided with several sets of grooves 188 to receive the abutment 183. By adjusting the abutment-holder and shifting the abutment from one set of grooves to another in the holder the machine can be adapted for lines of any length, from the shortest to the longest, which are required. A hook 189 upon the lower end of the abutment engages with a hinged abutment-raising plate 190, which extends along the entire line of adjustment of the abutment. This plate is raised during the first portion of the rotation of the movement-shaft F by an arm or branch 191 of the fulcrum-raising slide 176, Figs. 13 and 14.

Referring to Figs. 14 and 20, the follower-head 182 is carried by a follower-slide 192, sliding in grooves between the justifier-typeways. The follower-slide is constantly urged to the left by a band or belt 193 and weight 194, sliding in a guide-tube 195, and it is drawn to the right upon the completion of the justifying of each line by a band 196 and a heavier weight 197, sliding in a guide-tube $197^a$, the band being connected to a button 206 on the under side of the weight, Figs. 11, 13, 16, and 20. As the movement-shaft F revolves a block 198 upon a sheave 199 is engaged by a pawl 200 upon an arm 201, fixed on the shaft. The pawl carries the sheave around during the greater part of its revolution, and just before the shaft comes to rest the tail of the pawl is struck by a fixed projection 202 and the pawl is thrown off of the block 198. The sheave is prevented from moving backward by a retaining-latch 203, which engages a lug 204 on the opposite side of the sheave. As the sheave is carried around by the pawl it winds up a band 205, connected to a weight 197, and raises the weight, thus permitting the follower-slide to come under the influence of the smaller weight 194. The follower-slide 192 gradually moves to the left, carrying the line through the respacing mechanism of the justifier and finally to the galley. As the line reaches the galley the button 206 strikes a rod 207, which is connected to the retaining-pawl 203, and raises the pawl, releasing the sheave 199 and permitting the weight 197 to fall. This weight draws the follower-slide back to its initial position, as shown in Fig. 20. In this figure both the weights are shown at their upper positions to bring them within the scope of the drawing and the button is shown raised in order to show its operation, although it will be understood that the button is in its lowest position when the lesser weight 194 is raised.

Mounted in a groove in the front portion of bracket A' is a compacting-slide 208, which carries a depending hook 209, adapted to be drawn against the follower-head 182, Figs. 14, 15, and 20. After the abutment is raised the line of type on the ways 104 105 is compacted and measured between the abutment and the follower-head 182, the follower-head being drawn to the left by the hook 209. This movement is accomplished by means of a cam 210 on shaft F, operating on roll 211 and cam-lever 212, a spring-arm 213 on the cam-lever raising a slide 214, which operates through pinion 215 and gear 216 upon the compacting-slide 208, Figs. 15 and 20. The movement of the arm 213 is sufficient to compact and measure the shortest lines which may be assembled, and for longer lines the spring yields.

The rear end of the justifying-lever 157 is pivoted at 217 to the space-gage 218. The forward end of the lever has a depending toe 219, which is engaged by a knife-edge 220 on the left end of the compacting-slide 208. As the slide is drawn to the left to measure a line the movement of the slide will be proportional to the amount of space required to be added to or subtracted from the line to bring it to the standard length. As illustrated in Fig. 15, a line consisting of four words and provided with three temporary spaces s is being measured between the follower-head and the abutment 183. It will therefore be evident that the space correction to be made in the line for justification must be divided into three parts in order to space the line equally. To effect this, the word-counting mechanism has selected fulcrum-rod y, which has been raised and become operative, as the fulcrum for the lever 157, dividing the lever in a ratio of one to three. The gage 218 is therefore moved one-third of the movement of the follower-head, thus setting in for spaces equal to one-third of the total space to be added. If an assembled line of type exactly corresponds to or fills the measure, the gage will be set to produce justifying-spaces equal to the width of the temporary spaces. If the line is longer than the measure, the justifying-spaces will be narrower than the temporary spaces, and if it is shorter the justifying-spaces will be wider, as above described. In Fig. 15 a short line is illustrated, in which case each justifying-space will be equal to the temporary space plus one-third of the amount required to fill the line as determined by the measuring device. To withdraw the justifying-lever, the end of the justifying-lever is held in contact with the knife-edge of slide 208 by a spring 221, Fig. 15. The gage is normally drawn to the left by a spring 222.

When the space-gage 218 is set to control the justification of a line, it is immediately locked in position by two vertically-sliding wedges 223 224, which when dropped engage and lock a shoulder 225 on the gage, Figs. 9 and 12. The wedges are confined in a wedge-box 226 and provided with pins 227, which project through slots in the box and are sustained when the wedges are elevated by an L-shaped slide 228. The slide 228 is sustained in its elevated position by a pawl 229. Adjacent to the slide 228 is a vertically-moving slide 230, carrying a pawl 231. The tail of pawl 231 engages a fixed shoulder 232 when the slide 230 moves down, which throws the pawl into the path of the slide 228, and as slide 230 rises the pawl 231 is thrown out of said path by an upper shoulder 233, Fig. 12. The slide 230 is reciprocated by means of a pinion 234, Figs. 13 and 16, rock-shaft 235, and gears 236 237 238, the latter of which is in mesh with a gear 239 on the hub of sheave 199.

The operation of setting and releasing the wedges is as follows: Before the line-key is touched the wedges are held in their elevated position by the slide 228. Upon touching the line-key the movement-shaft F begins to revolve and the sheave 199 starts to revolve, drawing down the slide 230, and after the line of type has been measured and the justifying-gage set, as above described, the lower end of a flange 240 upon slide 230 engages the tail end of pawl 229, disengaging slide 228 and allowing the wedges to drop, Figs. 9, 10, and 12. The position of the pins 227 with relation to the wedge-surfaces is such that the right-hand wedge 223 takes effect first upon the lug 225. The other wedge quickly follows, and the two wedges lock the gage against movement in either direction. After the line has been justified and moved opposite the galley the weight 197 is released and dropped, as heretofore explained, and through the connections specified the slide 230 is raised, the pawl 231 raising the wedge-slide 228 and the wedges, the pawl 229 automatically locking it in its upper position. After the line is measured and the gage set the abutment is withdrawn and the line permitted to move to the respacing mechanism, impelled by the weight 194. It is desirable to relieve the line from the influence of the weight temporarily while the abutment is being withdrawn and also at other times. To accomplish this, means are provided for drawing down the band 196, and thus relieving the pressure of the follower-head upon the line. As illustrated in Figs. 11 and 16, a relief-lever 241 is pivoted on a hanger 242 beneath the base-plate. Upon this lever is a slide 243, and upon the lever and slide are grip-fingers 244, between which the band 196 runs. A smaller elbow-lever 245 is pivoted to the lever 241, and its shorter arm is pivoted to the slide 243. When the longer arm of 245 is raised, the grip-fingers are first pressed together upon the band, and afterward the lever 241 is moved, carrying the fingers down and drawing the follower-head back, thus relieving the pressure on the line. This movement is accomplished by an angular cam-lever 246, having a pin 247, which engages elbow-lever 245, and a portion which engages a cam 248 on the front end of shaft F. During the latter part of the revolution of shaft F the pressure is relieved from the line and the abutment drops. As the shaft completes its revolution the lever 246 falls over a step in the cam and the gripping-fingers release the band, permitting the weight 194 to carry the line to the respacing mechanism.

*Respacing mechanism.*—The space cutting and inserting mechanism is driven from a constantly-running shaft E. The spaces are cut from strips of space-timber T, preferably of type-metal, by a constantly-reciprocating knife 249 and inserted in the line in lieu of the temporary spaces s. The knife 249 is reciprocated by a crank 250 on shaft E and connecting-rod 251, which reciprocates the slide 252, on which the knife is fastened. Slide 252 runs in a vertical slot in the bracket A³, Figs. 10, 15, 18, and 21. The knife is preferably constructed with a series of cutting-teeth inclined to the direction of its motion, so that each succeeding tooth cuts deeper into the metal, Figs. 9 and 18. The space-timber T is in line with the gage 218. A tooth 253 upon a slide 254 engages a notch 255 near the left end of the space-timber and urges it constantly toward the space-gage, the slide being drawn to the right by a band 256, attached to a sheave 257 upon shaft 258, on the rear end of which is a pinion 259 in engagement with a vertical weighted rack 260, said rack being provided with a weight 261, sliding within vertical guides 262. The band 256 is carried over an idle-sheave 263, Figs. 12, 19, and 21. The timber is normally locked against movement by a locking-lever 264, Figs. 15, 19, and 21. The longer arm of lever 264 has a forked end which is engaged by an elbow-lever 265, which is connected by a link 266 to a slide 267, mounted in the left-hand edge of bracket A³. The slide 267 is normally drawn down by a spring 268, which spring normally holds the timber-locking lever 264 against the space-timber. When the slide 267 is raised, the locking-lever is released and the timber moves forward. This release is timed, as will be explained later, so that the timber will move forward against the gage when the knife is at its highest position. As the knife descends a space is severed from the timber. This release movement takes place only when the line has been properly separated to receive a justifying-space. After the abutment is withdrawn the line is drawn to the left along the typeways until the projecting ends of the first temporary space are intercepted by a pair of parting-fingers 269, connected by posts 270, extending through a transverse slot 271 in the ways, Figs. 11, 18, and 20. The parting-fingers 269 are reciprocated by an elbow-lever 272, the lower arm of which rests on a slide 273, which in turn rests on a pin 274 upon the end of a cam-lever 275, operated constantly by cam 276 on shaft E. As the parting-fingers 269 move to the left, followed by a temporary space, the protruding forward end of the temporary space strikes a trigger-lever 277, which brings into action the timber-releasing devices above described, permitting the justifying-space to be cut from the timber, and at the same time an elevating device is brought into action, which removes the temporary space from the line after it has been moved backward or to the right, such movement at the same time separating the line to receive the newly-formed space. The temporary spaces are ejected from the line into a transfer-magazine 278, which, during the justifying or respacing of the line, is held in the position shown in Fig. 11. The spaces are ejected from the line by an elevating-yoke 279, the branches of which run in vertical slots in the outer faces of the typeways, Figs. 11 and 18. The yoke 279 is moved by a link 280, connecting it with an elevator-slide 281 in the right-hand face of bracket A³, slide 281 being normally held down by a spring 282. The elevator is operated by a pawl 283, which normally plays idly up and down to the left of the foot of the elevator-slide 281, pawl 283 being connected to a slide 284, having a roll 285 resting on cam 286 on shaft E. The timber-locking slide 267 is periodically operated by a pawl 287, which normally plays up and down at the left of said slide, Fig. 11. This pawl is connected to a cam-lever 288, having a roll 289 resting on cam 290.

The upper ends of the pawls 283 287 are guided between pins on a horizontal slide 291, to which is pivoted the lower end of the trigger-lever 277. Each time the trigger is operated by a temporary space the lower end of the lever and the slide 291 are moved to the right, carrying the pawls 283 287 under their respective slides 281 267, and they are retained in this position temporarily by a spring-detent 292, which is normally held down by a hook 293 on slide 284, but released by a slight upward movement of the slide. The upward movement of pawl 287 releases the space-timber through the connections hereinbefore described, permitting the timber to move forward and a space to be cut. This space is immediately transferred to the line by mechanism to be presently described. When the parting-fingers next move to the right, the temporary space which has operated the trigger-lever is carried backward to register with the space-receiving magazine 278 and with the elevator-yoke. The elevator is now operated by a continued upward movement of the slide 284 and the temporary space is driven into the transfer-magazine, the space being retained in the magazine by spring-hooks 294. As the elevator rises, a leg 295, connected with slide 281, draws up the end of the elbow-lever 245, Fig. 11, thereby relieving the pressure of the follower-head upon the line, as already explained, to prevent the type adjacent to the elevator from being disturbed as the temporary space is removed. The newly-cut justifying-space is moved into the opening in the line at the left of the parting-fingers while the temporary space is being ejected. As the elevator moves down, the follower is released and the line moves to the left through the parting-fingers until the succeeding temporary space is intercepted, when the operations above described are repeated. The justifying-spaces $s'$ while being severed from the timber are supported on a cutter-block 296, Figs. 13 and 18. The cutter-block is moved back and forth by an elbow-lever 297, being normally drawn backward by a link 298 and spring 299, the link 298 being operated by a cam-lever 300, having a roll 301 resting on cam 302 on the rear end of shaft E, Figs. 12 and 18. Above the cutter-block and sliding between the cutter-block and the cap-piece 303 is a fork 304. This fork is normally drawn back against a pin 305 on the cutter-block by a spring 306. The rear end of the fork is connected by a link 307 with a lever 308, pivoted in the cutter-block. As the cutter-block moves forward the fork moves with it until the tail end of lever 308 strikes the projecting pin 309 on the bracket, which gives the fork a slight movement forward upon the cutter-block. The cutter-block is moved to its extreme rear position beyond the path of the space-timber, while the timber is being fed to the gage, to prevent chips or dirt getting in between the timber and the gage. The cutter-block then moves forward until its forward end passes under the timber. It then remains stationary until the space is cut from the timber, after which it is given an additional forward movement, carrying the space to the position shown in Fig. 18. On reaching this position the fork 304 is given its additional movement, as already explained, which pushes the space off of the cutter-block, permitting it to drop onto a circular runway 310, cut in the bracket A'. The right side of the runway is formed by a curved piece 311, carried by the justifying-space gage 218. The curved piece 311 being attached to the space-gage varies the width of the runway to correspond with the size of space being cut. The spaces are carried positively through the runway and into the line on the justifying-typeways and under an adjustable block 312 by a vibrating arm 313, Fig. 18. The arm 313 is carried by a shaft 314, which is rocked by means of a pinion 314$^a$, Figs. 19 and 20, and rack 315, the lower end of which is connected by a link 316 with a cam-lever 317, having a roll 318, resting on a cam 319, and an arm 320, resting on a cam 321. The slide 315 is raised positively by a cam 319 and drawn down by cam 321.

A brush 368 is held against the knife 249 during its upward movement by a spring 369 to clear it of any cuttings that may adhere to it, Fig. 21. The brush is held away from the knife during its downward movement by a cam 370 on shaft E, operating on a roll 371 upon an arm 372 of the shaft 373, which carries the brush-arm 374. The chips of space metal from the knife fall into a chute 405, Fig. 12, which delivers them into a tube or spout 406.

The space-transfer magazine 278 is carried by a pair of parallel arms 322, Figs. 10, 11, 12, and 13. The lower arm is upon a rock-shaft 323, which is reciprocated by a gear 324 and the vertically-moving rack 230, before described, the teeth in the rack being inclined to correspond to the inclined axis of the shaft 323. A gear 325, connected with the upper arm 322, is driven through an intermediate gear 326 by the gear 327 on shaft 323. These gears being of equal size, the arms are rocked simultaneously and always remain parallel, and in consequence the space-transfer magazine always retains a vertical position. While the temporary spaces are being removed from a line, the magazine 278 stands over the elevator and receives the spaces, as shown in Fig. 11. After the line is justified the slide 230 is raised by the weight 197, as before described, and the arms 322 are rocked to the right, carrying the transfer-magazine over into a position in which it registers with the temporary-space channel $m'$ of the magazine. The spring-hooks 294 are pushed back by the outer wall of the channel $m'$, thus releasing the spaces in the magazine 278 and permitting them to fall into the space-channel. The slide 230 is made in two parts, which are united by a sliding joint and connected by a spring 230$^a$, Figs. 12 and 13. This spring seats the magazine 278 yieldingly over the elevator, and if a space becomes bent or for any other reason does not register with the magazine the latter will yield when the elevator rises and no harm will result.

*Line-assembling mechanism.*—The line having been justified and transferred to the left end of the justifying-ways 104 105, as already explained, it is transferred to the galley by the mechanism to be presently described. The galley H is situated in front of the machine at the left end and sustained on the bracket $a^4$, Figs. 10, 17, 18, and 19. In the rear of the ways opposite the galley is a line-ejecting plate 328, having racks which are operated by pinions 329 upon a shaft 330. Shaft 330 is operated by a vertical rack 331 in mesh with the pinion 332 upon the end of the shaft, Fig. 15. The rack 331 is operated by a link 333, walking-beam 334, eccentric-strap 335, and eccentric 336 on shaft F, Fig. 20. It will be evident that the line-ejecting blade will be reciprocated forward and back each time the movement-shaft F revolves. The forward movement of the blade carries a line of type into position at the head of the galley. During the rearward movement of the slide 328 the line of type is moved down into the galley by a depressing-bar 337, connected to the slide through links 338, arms 339, rock-shaft 340, arm 341, and link 342, Figs. 10 and 19. The type are sustained in the galley upon a movable ledge 343, carried by a bracket 344, which is hinged to a slide 345, movable in a guide-channel 346. The slide is sustained by a cord 347 and weight 348, Figs. 10 and 17. The slide 345 is held in its depressed position by a frictional grip 349, which has a square notch to engage the side of the guide-channel 346. As the type are moved to the left they are drawn under the line friction-rail 350. The type are relieved from the pressure of this rail as the ejector-blade moves forward by a cam 352 upon the blade, which engages the pin 353 on one of the arms 351, carrying the rail.

There is a lead-magazine 354 located above and partially in the rear of the galley. When leads 355 are supplied to the magazine, a lead from the bottom is pushed out each time the ejecting-blade moves forward and deposited with the line of type in the galley, as shown in Fig. 19. When no leads are in the magazine, the lines will be assembled solid. In order to prevent the line as it is being pushed into the galley from disturbing the preceding line, which might be caused by the heads of the type striking the nicks in the preceding line, the forward ends of the type are supported during part of their forward movement by a plate 356, carried by slides 357, operated by arms 358 upon a rock-shaft 359. The plate 356 is held normally in line with the way 104 by spring 360. As the line is being moved forward the plate is moved forward by the cam 361 on shaft 330, which cam moves an arm 362, engaging a shoulder on a link 363, which is pivoted to one of the arms 358. After the plate 356 is moved forward to the length of its throw the cam 361 strikes the end of the arm 363, releasing it from the lever 362 and permitting the plate to be thrown back by spring 360. In this manner the forward ends of the type are carried over the nicks in the previous line.

The walking-beam 334 is fulcrumed to a movable rack 364, Figs. 16, 18, and 20, which engages a pinion 365 on a shaft 366, provided with a hand-lever 367 on the front of the machine. When it is desired to eject a line from the ways to the galley without bringing the movement-shaft into action, it can be done by turning the crank 367 and raising the fulcrum-slide 364, thereby operating the slide 331 and the line-ejecting mechanism.

*Automatic timber-loading mechanism.*— The justifying mechanism is supplied with space-timber from a timber-magazine 375, Figs. 10, 12, 19, and 21, the ends of the pieces of timber being held by flanges 376. The timber in the magazine is in the rear of the active piece of timber which is being fed to the cutter, and the pieces rest normally upon an ejecting-plunger 377, which is reciprocated backward and forward by racks 378, pinions 379 on shaft 380, which is rocked by a pinion 381, and vertical slide-rack 382. When a piece of timber is nearly used, the timber-carrier slide 254 is drawn back to its initial position by a mechanism to be presently explained. Simultaneously the plunger 377 is drawn back, a new piece of timber falls down in front of it, and plunger 377 immediately moves forward, pushing the new piece of timber into active position in line with the gage and discharging the previous piece through on the opening $375^a$ in the front of the timber-magazine. While these movements are taking place the pressure of the timber-clamp 264 is relieved and the operation of the justifying mechanism is suspended, as will now be explained. The slide 382 has a roll 383 resting on the cam 304 of the shaft G. The shaft G is normally at rest, and upon it is a gear 385, which is driven at one-half the speed of the power-shaft E through a train of gears 386 to 389, inclusive, Figs. 16, 17, and 21. Upon the gear 385 are two teeth 390. Upon the shaft G is an arm 391, carrying a spring-pawl 392, which constantly tends to spring into the path of the teeth 390, but is normally held out of their path by a stop-lever 393, which has an incline or wedge 394 at its lower end. Upon the timber-weight 261 is an incline 395, which engages a pin 396 and withdraws the lower end of the lever 393, permitting the spring-pawl 392 to engage the gear 385 when the timber-weight reaches its lowest position, at which time the piece of timber in use is nearly exhausted and should be renewed. The shaft G thereupon makes a revolution with the following effect: When the shaft starts, a pin 397 on the shaft releases a pawl 398, which pawl immediately springs against the rod 273 and which operates the parting-fingers, and when said rod reaches its uppermost position the pawl engages a notch 399, which prevents the parting-fingers from returning until the shaft G has made a complete revolution and the pin 397 again withdraws the pawl, Figs. 17 and 20. The parting-fingers, being held to the right, prevent the trigger-lever from being operated, which suspends the operation of the elevator, preventing any further temporary spaces from being removed until a new piece of timber is in position to supply justifying-spaces. As the shaft G starts, the timber-locking slide 267 is raised to release the timber. This is effected by a roll 400 upon the slide, which rests upon the cam 401 upon the shaft G, Fig. 11. The weight 261 has a foot 402, which is engaged by a roll 403 on an arm of the shaft G, the roll raising the weight during the first half of the revolution of the shaft. The weight is sustained in its uppermost position by the circular portion of a cam 404 following the roll while the new piece of space-timber is being driven into position on the tooth 253, Figs. 12 and 21. A step in the cam 404 then permits the timber to be advanced sufficiently to get behind the timber-locker 264, and a circular portion of the cam holds the timber in this position until the locker is released, after which the cam passes from under the weight, which then tends to move the timber to the gage, the timber being held by the locker.

*Operation of the machine.*—The movements of the machine are divided into several groups which are wholly or partially independent of each other. The principal groups of movements are, first, the type-assembling movements, which are initiated by the type-keys; second, the line-transferring movements and gage setting and locking movements, which are initiated by the line or starting key; third, the respacing movements, which take place each time a temporary space is presented to the respacing mechanism; fourth, the movement of the lines into the galley, which takes place each time the line or starting key is operated, and, fifth, the timber-supplying movements, which take place whenever the active piece of timber is nearly exhausted.

The first group includes the movements of the type-assembling mechanism, which movements take place upon the depression of any of the keys 1 of the keyboard or the simultaneous depression of a group of keys. Upon the depression of a key for the selection of a type the universal bar 4 is raised, which trips the escapement-clutch, and the escape-shaft 34 makes a revolution, Figs. 2, 3, and 9. By the first movement of the shaft the type-fingers are dropped and the primary nick-guide raised by the cams 78 and 85, respectively. The vertical slide 40 is drawn down by the crank, drawing the type-carrier to the right and rocking the type-ejector shaft 42, which latter movement throws the ejector-bar 45 forward and ejects the selected type onto the runways. The primary nick-guide is dropped on the type as it arrives on the runways. The type-fingers are then raised and carried to the left, depositing the type in the stick. At the same time the type-ejector bar 45 is drawn back, and as the shaft completes its revolution the parts are all restored to their normal or initial positions. During the rotation of the escape-shaft the keys which have been operated are locked down and those which were not operated are locked up, as has been explained.

While a line is being assembled on the stick the space-key 130$^a$, operating through its lifter-bar and the space-ejector 16$^a$, Figs. 2 and 9, sets the interponent 156 under the proper fulcrum-bar, and the next set of movements which are imparted from shaft F operate to measure the line and set the gage. At the completion of a line the line or starting key 92 is depressed and the weighted slide 98 released from the holding-pawl 97. As the slide falls the line is drawn back from the assembling-typeways to the justifying-typeways by the transfer nick-guide and they are seized and retained by the retaining nick-guide 107. The first movement of the slide 98 drops the retaining-pawl 171, which holds the interponent under the proper fulcrum-bar. The line is thus placed in position to be measured, and the interponent is retained in position to raise the proper fulcrum for the justification of the line. The continued downward movement of slide 98 trips the clutch and starts the movement-shaft F, Figs. 9 and 13. As the shaft F begins to rotate the fulcrum-shaft is rocked through slide 176 and the selected fulcrum raised, and the abutment is simultaneously raised by the branch rod 191, Fig. 13. At the same time the line-transfer mechanism is returned, and the sheave 199 begins to raise the weight 197, Figs. 11 and 16. As the shaft F continues the line is compacted or measured, the space-gage is set, and the locking-wedges are dropped to lock the gage. Succeeding these movements the pressure of the compacting-head is withdrawn by the cam 210, the pressure of the follower-head is relieved by the lever 241, Figs. 11 and 16, and the abutment and fulcrum-bar are lowered. Just as the shaft F completes its revolution the relief-lever releases its grip and the weight 194 is permitted to carry the line to the respacing mechanism. As the weight 197 is raised the space-transfer magazine 278 is carried from the magazine M into position over the elevator, the transfer-magazine being geared to the sheave which operates the weights, Figs. 11 and 16. The weight 197 remains elevated, and the space-magazine 278 remains in position over the elevator until the line has been completely respaced and carried to the end of the ways opposite the galley, the weight-raising sheave being held during this period by the latch 203, Fig. 20. After the line has been respaced and moved opposite the galley the latch 203 is released, the weight 197 falls, raising weight 194, returning the follower-head to its initial position and carrying the space-transfer magazine over to deposit its spaces in the space-channel $m'$.

The power-shaft E, which operates the respacing mechanism, revolves continuously. As the type-line is carried to the left the projecting ends of the first temporary space engage the parting-fingers 269, and as the parting-fingers move to the left the forward end of the space operates the trigger-lever 277. The knife is continually reciprocated and the movements are timed so that the trigger-lever is operated while the knife is approaching its highest position. When the parting-fingers again move to the right, they leave the first word of the line (which has passed between them) standing on the ways and carry the balance of the line backward until the temporary space stands over the elevator, thus parting the line at the left of said space. While the line is being parted and following the operation of the trigger-lever, the elevator-slide is partially raised and the trigger-slide 291 locked. The space-timber is then released by the upward movement of pawl 187, Figs. 11 and 15, the timber moves against the gage, and the knife descends and cuts a justifying-space from the end of the timber. The cutter-block moves forward and deposits the cut space in the end of the circular runway, and the arm 311 moves the space into the opening in the line. The elevator is then raised, removing the temporary space from the line into the magazine. As the elevator rises the pressure of the follower-head is relieved by the relief-lever, and when the elevator returns the follower-head is released and the line is carried to the left until the next temporary space engages the parting-fingers. The above-described operations are repeated for each space in the line. After the last temporary space is replaced the line moves into position opposite the galley, as above described. As the knife reaches its lowest position the brush moves against it, and as the knife rises the adhering chips are brushed off.

Each time a line is assembled and the shaft F is started to operate the justifying mechanism the preceding line, which has been justified, is moved from the ways into the galley, the line-shifting plunger 328 being operated by the eccentric 335 on shaft F. The return movement of the slide depresses the line in the galley, making room for the succeeding line, Figs. 17, 19, and 21.

The timber-loading mechanism is controlled by the small shaft G, which is normally at rest. As the active piece of timber becomes nearly exhausted the weight 261, which feeds the timber forward, trips a clutch and starts the shaft G with the following effects: The operation of the respacing mechanism is immediately suspended, the parting-fingers being locked. The timber-locking lever is then released, the weight is raised, and the timber-moving slide is withdrawn. The timber-plunger 377 then moves backward, permitting a new piece of timber to fall from the magazine in front of it, and then forward, driving the new timber into position in line with the gage and ejecting the remnant of the previous piece of timber. While this operation is taking place, the tooth 253, which feeds the timber, is held stationary. When the new piece of timber is in place, the tooth moves to the right, carrying the timber into the clamp or locker 264. The timber is then locked, and, finally, as the shaft G completes its revolution the respacing mechanism is released and proceeds to cut justifying-spaces from the new piece of timber.

It will be evident that many changes in the details of construction of the above-described machine may be made without exceeding the spirit and scope of the invention. It is to be understood, therefore, that the invention as defined in the specification and in the following claims includes and covers mechanical equivalents of the several parts and combinations as well as the exact construction illustrated and described.

I claim—

1. In a type-setting machine, the combination with the key-levers, of a universal bar, an escape-shaft, devices connected with the universal bar for tripping the escape-shaft, and a locking-bar arranged to prevent the operation of a key while the escape-shaft is in operation, substantially as described.

2. In a type-setting machine, the key-levers, the universal bar, the key for shifting from lower to upper case, and means for locking the universal bar and the key-levers during the movement from lower to upper and upper to lower case, substantially as described.

3. In a type-setting machine, the combination of the key-levers, the universal bar, the type-ejectors, the ejector-bar, and means for preventing a key from being operated until the previously-indicated type has been ejected and its ejector and the ejector-bar returned to normal position, substantially as described.

4. In a type-setting machine, the combination with the key-levers and the magazine, of the type-ejectors, the ejector-bar, the universal bar, and a device, such as the lever 51, for interlocking the ejector-bar with the universal bar, substantially as described.

5. In a type-setting machine, the combination with the key-levers and the universal bar, of push-rods operated by the key-levers, a cap-key and connections for shifting the upper ends of the push-rods, and devices, such as the leg 28 and post 32, for interlocking the cap-key with the universal bar to prevent the operation of any character-key while the cap-key is being operated, substantially as described.

6. In a type-setting machine, the combination with the type-ejectors and the push-rods, of the guide 19 and the shifting bar 25 both having slots of varying widths through which the push-rods pass, substantially as described.

7. The combination with the key-levers, of the elbow-levers, provided with cam-surfaces $13^a$ and curved surfaces $14^a$, as and for the purpose set forth.

8. In a type-setting machine, the combination with the key-levers having pins, of the elbow-levers having cam-surfaces coacting with the pins on the key-levers, and curved surfaces coacting with the pins and arranged to permit the key-levers to move without imparting further movement to the elbow-levers, and push-rods operated by said elbow-levers, substantially as described.

9. In a type-setting machine, the combination with a magazine, and a way upon which type are delivered from the magazine, said typeway having an assemblage portion or stick, of a carrier, and means for moving the carrier positively along the way past the magazine and yieldingly into the stick, substantially as described.

10. In a type-setting machine, the combination with a typeway having an assemblage portion or stick, of a type-carrier, a reciprocating driver for moving the carrier, and means for engaging the carrier positively with the driver during a portion of its movement along the ways and for engaging it yieldingly with said driver during the balance of said movement, substantially as described.

11. In a type-setting machine, the combination with a typeway, of a type-carrier, and a reciprocating driver, said driver and carrier being constructed to mutually engage positively during the backward movement and a portion of the forward movement, and to mutually engage frictionally during the balance of the forward movement, substantially as described.

12. The combination with a typeway and stick and a pair of type-carrier fingers having an arm 67, of a type-driver having a post for positively drawing said arm rearward and a pawl for positively moving the arm forward, a spring-clamp for yieldingly carrying said arm forward, and means for shifting said arm from the pawl to the clamp as the type-fingers enter the stick, substantially as described.

13. In a type-setting machine, the combination with a typeway and stick, of a type-carrier movable along said way, a type-driver, a reciprocating belt for moving the type-driver along the way, and means for engaging the carrier positively with the driver during a portion of its travel and for engaging it yieldingly with the driver during the balance of its travel, substantially as described.

14. In a type-setting machine, the combination with a typeway, a type-carrier movable along said way and a guide for said carrier, of a type-driver adapted to engage the type-carrier both positively and yieldingly, said guide having a cam portion for lifting the type-carrier out of positive engagement with the type-driver during its forward movement, substantially as described.

15. In a type-setting machine, the combination with a magazine and type-ejectors, of an ejector-bar, means for engaging the ejectors with said bar, a rock-shaft, arms and links connecting said rock-shaft and ejector-bar, and means for rocking said shaft one hundred and eighty degrees, whereby said ejector-bar is started and stopped gradually, substantially as described.

16. In a type-setting machine, a magazine having a fixed section containing channels and a hinged movable section containing channels, said movable section being adapted to swing backward and sidewise for loading and to register with the stationary section when loaded, substantially as described.

17. In a type-setting machine, the combination with a stationary section of the magazine, of the movable section provided with a hinge upon which it is adapted to swing backward and a pivot upon which it may swing sidewise into position for loading, substantially as described.

18. In a type-setting machine, a two-part magazine, the upper part having channels which register with channels in the lower part, and movable sustaining-pins for temporarily sustaining the type in the upper portion of the magazine, substantially as described.

19. In a type-setting machine, the magazine having a fixed section, a bracket pivoted to said section, a movable magazine-section hinged to the bracket, and a latch pivoted to said bracket and adapted to lock the hinged section of the magazine in line with the stationary section, substantially as described.

20. In a type-setting machine, the magazine having a movable section divided into channels by partitions, said partitions having notches or recesses at their upper ends to receive the ends of the typeways, substantially as described.

21. In a type-setting machine, the combination with assembling mechanism, justifying mechanism, and intermediate typeways, of a movable inspecting-stick adjacent to said typeways, and means for transferring a line of type from the typeways to said stick, substantially as described.

22. In a type-setting machine, the combination with the assembling mechanism, justifying mechanism, and intermediate typeways, of a detachable and removable inspecting-stick adjacent to said typeways, and means for transferring a line of type from the ways to said stick, substantially as described.

23. In a type-setting machine, the combination with the assembling mechanism and typeways, of an inspecting-stick which is movable into position adjacent to the typeways to receive a line of type and into an inclined position to present the faces of the type to the operator for inspection, substantially as described.

24. In a type-setting machine, the combination with the magazine and typeways, of an inspecting-stick and a laterally-movable nick-guide constructed to engage with and transfer a line of type from the ways to said stick, substantially as described.

25. In a type-setting machine, the inspecting-stick consisting of a plate pivotally supported in swinging arms and a flange movably connected to said plate and adapted to support the type when the plate is inclined, substantially as described.

26. The combination with the assembling mechanism, justifying mechanism and intermediate typeways, of the inspecting-stick adjacent to said ways, and manually-operated means for transferring type from said ways to said stick, substantially as described.

27. The combination with the assembling typeway and the inspecting-stick, of a device for transferring a line of type from the typeway to said stick, said device being normally locked in position for engaging with the type on the typeway, and means for unlocking said device and drawing it forward by hand to transfer the type to the inspecting-stick, substantially as described.

28. In a type-setting machine, the combination with the ways, of a hinged transfer nick-guide, constructed to move a line of type positively in one direction and to free itself from said type when moved in the opposite direction, substantially as described.

29. In a type-setting machine, the combination with the ways, of the transversely-movable bar 87 and the transfer nick-guide pivotally connected to said bar, substantially as described.

30. In a type-setting machine, the combination with the assembling-typeways and the justifier-typeways, of the transfer nick-guide, means for moving the same laterally, the retaining nick-guide and means for moving the same vertically, whereby the type are transferred from the assembling-typeways to the justifier-typeways and retained on the latter typeways, substantially as described.

31. The combination with the slide 98, of the transfer nick-guide connected with and operated by said slide and the retaining nick-guide also connected with and operated by said slide, substantially as described.

32. In a type-setting machine, the combination with the magazine and assembling-typeway, of a primary nick-guide, and a secondary transfer nick-guide normally in line therewith, said secondary nick-guide being constructed to yield vertically, substantially as described.

33. In a type-setting machine, the combination with the magazine and assembling-typeway, of a primary nick-guide and a secondary transfer nick-guide normally in line therewith, said secondary nick-guide being spring-seated whereby it may yield vertically, substantially as described.

34. In a type-setting machine, a space-ejector operating in response to the space-key and a space-counting device operated by said space-ejector, substantially as described.

35. In a type-setting machine, a space-ejector provided with a cam-surface and a space-counting device operated from said cam-surface, substantially as described.

36. In a type-justifying machine, a justifying-lever, a series of fulcrum-bars, means for selecting the proper fulcrum for each line, and means for rendering said fulcrum operative upon the lever and positively withdrawing it therefrom, substantially as described.

37. In a justifying-machine, the combination with the typeway, and means for measuring a line of type upon said way, of a stop or abutment for the line, a holder for said abutment, said holder being adjustable to adapt the machine for different lengths of lines, substantially as described.

38. In a type-justifying mechanism, the combination with means for measuring a line of type, of a movable abutment against which the line is measured and a holder for said abutment, said holder being adjustable and said abutment being also adjustable relatively to the holder, to adapt the machine for different lengths of lines, substantially as described.

39. In a type-justifying machine, the combination of a way and a follower for moving the type along said way, of the means for relieving the pressure of the follower upon the type consisting of a band connected with the follower, and a movable clamping device constructed to seize the band and draw the follower backward, substantially as described.

40. In a type-justifying machine, the combination of a way and a follower for moving type along said way, of a weight for drawing said follower toward the galley, a counterweight for returning said follower, a detent for sustaining the counterweight in an elevated position while a line is moving toward the galley, a band connected with the follower and with a button below said counterweight, said detent being released by said button as the line reaches the galley, whereby the counterweight is dropped upon the button and the follower-head returned, substantially as described.

41. In a type-justifying machine, means for feeding a strip of space-timber, a movable cutter for severing justifying-spaces from said timber, and a brush operating to remove the chips from said cutter, substantially as described.

42. In a type-justifying machine, means for feeding a strip of space-timber, a movable cutter for severing justifying-spaces from said timber, a cleaning-brush, and means for moving it to and from said cutter, substantially as described.

43. In a type-justifying machine, means for feeding space-timber, a reciprocating cutter constructed to sever a space during its forward movement and a brush arranged to remove the chips from the cutter during its backward movement, substantially as described.

44. In a type setting and justifying machine, a magazine for temporary word-spaces, means for assembling said spaces with type in lines, means for removing said spaces and inserting justifying-spaces in lieu thereof, a transfer-magazine for receiving the spaces removed from the line, and means for automatically carrying the transfer-magazine to the space-magazine and discharging the spaces into said latter magazine, substantially as described.

45. In a type-justifying machine, the combination of an elevator for removing temporary spaces, a transfer-magazine arranged to receive said spaces and automatic means for carrying the transfer-magazine to the assembling mechanism and returning it to the justifying mechanism whereby the removed spaces are periodically deposited in the magazine of the assembling mechanism, substantially as described.

46. The combination of means for assembling a line of type and temporary spaces, means for removing the temporary spaces and automatically returning them to the assembling mechanism, and means for forming justifying-spaces and inserting them in lieu of the temporary spaces, substantially as described.

47. The means for returning temporary spaces to the assembling mechanism consisting of a pair of rock-shafts, parallel arms carried by said rock-shafts and a transfer-magazine carried by said parallel arms, substantially as described.

48. In a type setting and justifying machine, the temporary-space magazine, a space transfer-magazine, an elevator constructed to eject spaces from the ways into said transfer-magazine, and mechanism for moving said transfer-magazine from the elevator to the space-magazine and vice versa, said mechanism including a spring connection whereby the transfer-magazine is yieldingly seated over the elevator, substantially as described.

49. In a type-justifying machine, a space-timber magazine adapted to hold a plurality of pieces of timber, a space-cutter, and automatic means for feeding successive strips of space-timber from said magazine to said cutter, substantially as described.

50. In a type-justifying machine, a space-cutter, means for feeding a strip of space-timber to said cutter, a space-timber magazine, and automatic means for ejecting a remnant of timber from the feeding device and substituting a new strip of timber in lieu thereof, substantially as described.

51. In a type-justifying machine, a space-cutter, a slide adapted to engage with a strip of space-timber, means for moving the slide and strip toward the cutter, means for withdrawing the slide and the remnant of strip when the available portion is consumed, and means for disengaging the remnant from the slide and engaging a new strip therewith, substantially as described.

52. In a type-justifying machine, the combination of the space-timber magazine, the plunger for moving the bottom strip laterally from said magazine into line with the cutter, the means for moving the strip toward the cutter, and the cutter constructed to sever justifying-spaces from the strip, substantially as described.

53. In a justifying-machine, the combination of the space-timber cutter, the slide adapted to engage a strip of space-timber, a weight connected to the slide for moving the timber to the cutter, and means for periodically raising the weight to return the slide, substantially as described.

54. In a justifying-machine, strips of space-timber provided with notches, in combination with a feeding device having a tooth adapted to engage said notches, substantially as described.

55. In a type-justifying machine, devices for forming justifying-spaces and inserting them in lines of type, said devices including a passage or runway for the spaces, and means for varying the width of the runway proportionately to the widths of the spaces, substantially as described.

56. In a justifying-machine, means for forming justifying-spaces, a gage for determining the widths of said spaces, and a runway into which the spaces are delivered, one side of said runway being stationary and the opposite side being movable with the gage, substantially as described.

57. In a justifying-machine, the combination with a cutter, and means for feeding space-timber to the cutter, of a gage, a runway into which the cut spaces are delivered, and a piece carried by said gage and forming one side of said runway, substantially as described.

58. In a justifying-machine, the combination with typeways, of a space-forming device situated higher than said typeways, and a curved runway extending from the space-forming device down to said typeways, substantially as described.

59. In a justifying-machine, means for feeding space-timber, a cutter for severing justifying-spaces, and a movable cutter-block, substantially as described.

60. In a justifying-machine, means for feeding space-timber, a cutter for severing justifying-spaces, a cutter-block, and means for imparting an intermittent movement to the cutter-block to carry it to and from the cutter, substantially as described.

61. In a justifying-machine, the combination with means for feeding space-timber, a cutter, a reciprocating cutter-block and a fork movable relatively to the cutter-block and adapted to discharge the cut spaces from said block into a runway, substantially as described.

62. In a justifying-machine, the combination with means for feeding space-timber, and a cutter, of a movable cutter-block and a fork arranged to slide on said cutter-block, means for moving the cutter-block and fork forward after the space is cut, and means for imparting to the fork an additional movement to eject the space into the runway, substantially as described.

63. In devices for transferring lines of type from a runway to a galley, an ejecting-plate for moving the type and a supporting-plate normally forming part of the runway and movable to support the forward ends of the type during a portion of their movement into the galley, substantially as described.

64. In devices for transferring lines of type from a runway to a galley, a sliding plate normally forming part of the runway, means for moving said plate forward to carry the ends of the type over the nicks of the previous line in the galley, and means for returning said plate, substantially as described.

65. The combination of a part to be raised having an operative face, such as the foot 402, of a shaft, an arm on said shaft provided with a roll for engaging said face, and a cam on said shaft arranged to follow the roll and sustain the part raised thereby, substantially as described.

In testimony whereof I affix my signature in presence of two witnesses.

FRANK AMOS JOHNSON.

Witnesses:
JAMES A. WATSON,
W. CLARENCE DUVALL.